FIG. I

INVENTOR.
GAYLORD W. BROWN
EDWARD J. RUSSELL
CHARLES E. HOWE
BRADLEY A. SCHNEPP
BY
Learman & McCulloch

United States Patent Office 3,669,594
Patented June 13, 1972

3,669,594
MODULE THERMOFORMING MACHINE
Gaylord W. Brown, Beaverton, Edward J. Russell, Gladwin, and Charles E. Howe and Bradley A. Schnepp, Beaverton, Mich., assignors to Koehring Company, Milwaukee, Wis.
Filed Apr. 9, 1970, Ser. No. 26,840
Int. Cl. B29c 17/03, 17/04
U.S. Cl. 425—186
53 Claims

ABSTRACT OF THE DISCLOSURE

A synthetic plastic sheet thermoforming machine, preferably of modular construction, and incorporating elevator, heating, molding, and Lowerator stations. Sheet carrying carts move through the machine in a circuitous path from a loading station at which unformed sheets are loaded to the carts to an unloading station at which formed sheets are removed from the carts.

This machine relates to thermoforming machinery in which plastic sheet carrying carts are moved in a circuitous path to various stations and more particularly to a machine of considerable size which is capable of differential pressure forming products such as boat decks and hulls, one-piece trailer roofs, recreational vehicular bodies and other good sized products or articles in synthetic plastic sheets.

One of the prime objects of the machine is to provide a machine which can be fabricated in the form of separate and independent modules and then shipped as individual modules to a site where it can be readily and conveniently assembled to form a unitary machine of the character indicated.

Another object of the invention is to provide a machine of the type described which does not require that there be a separate cart drive member provided at each module or station, and where, in fact, the carts are automatically coupled and disengaged for travel in tandem during at least a portion of their circuitous travel.

Still another object of the invention is to provide a system of this character wherein the cart is automatically disengaged at the mold station so that it can travel vertically to a female mold, and then is automatically re-engaged when the thermoforming operation is completed and the cart is raised to original position.

Still another object of the invention is to provide simple and reliable mechanism for moving the sheet carrying carts in the circuitous parth of travel mentioned.

Another object of the invention is to provide mechanism for achieving a proper clamping pressure at the mold assembly and assuring that the molds will not be separated by the differential pressure forming operations.

Still another object of the invention is to provide a system of the type described wherein cart carried, fluid pressure operated cylinders may be used to clamp the sheet to the carts, and the cylinders may be supplied at the proper time with operating fluid by a fluid injection mechanism which does not move around the circuit with the carts.

Other objects and advantages of the invention will become apparent as the various components of the invention are described and as a result of reference to the accompanying drawings and claims.

Broadly, but not exclusively, the invention is concerned with a mold assembly station, an adjecent sheet heating station, sheet carrying carts in which the sheets to be thermoformed may be transported and which are couplable for tandem movement, and mechanism for moving the carts circuitously through the stations. A cart elevator and Lowerator are provided and mechanism is also provided for vertically moving the carts at the mold station and for clamping the molds together. Further provided is an air-injection system for powering clamping cylinders carried by each sheet transporting cart.

IN THE DRAWINGS

FIG. 14 is a similarly enlarged, fragmentary, sectional plan view taken on the line 14—14 of FIG. 12;

GENERAL DESCRIPTION

Figure 1:
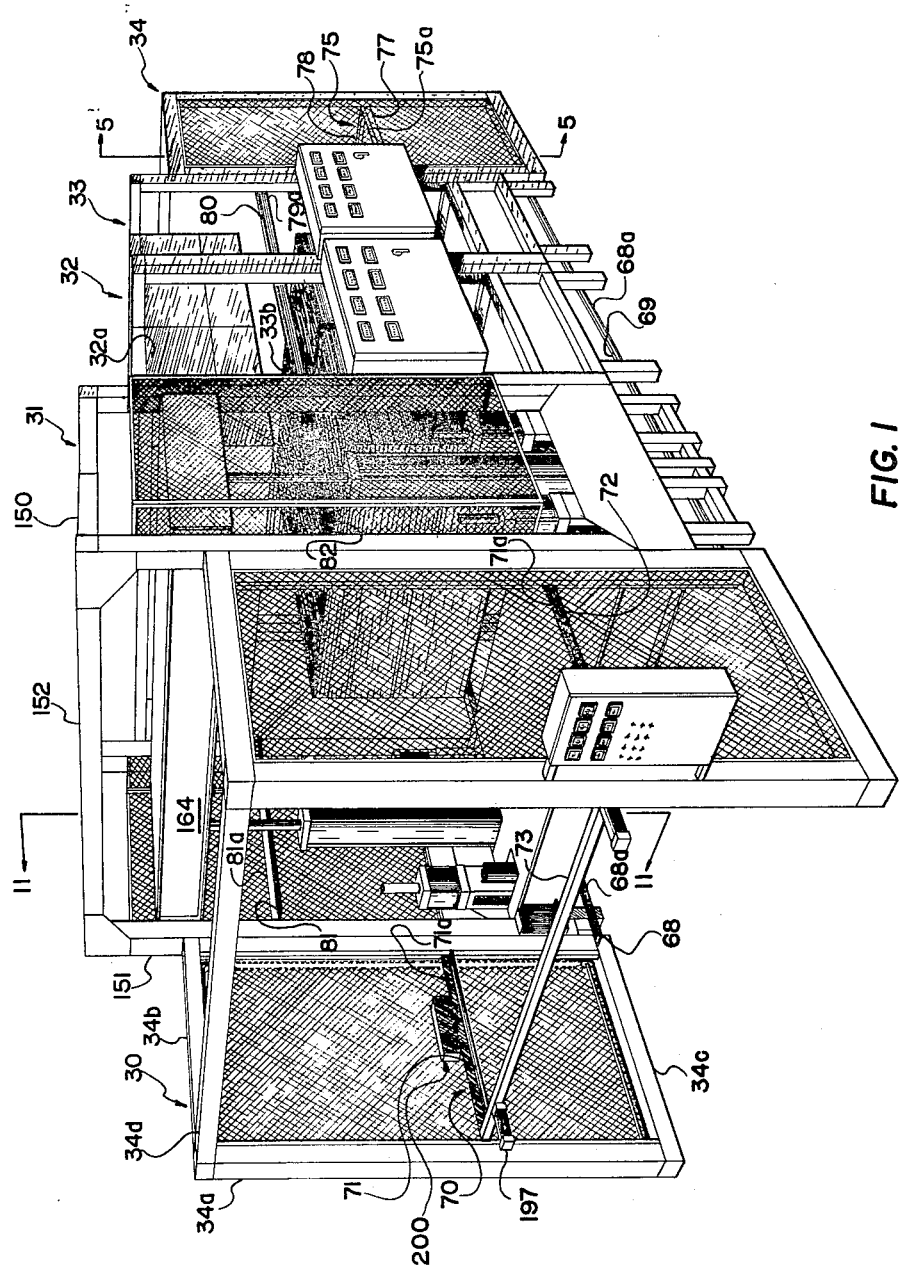
FIG. 1 is a perspective elevational view of the machine looking from the Lowerator end thereof and omitting various parts in the interest of clarity.
Figure 2:
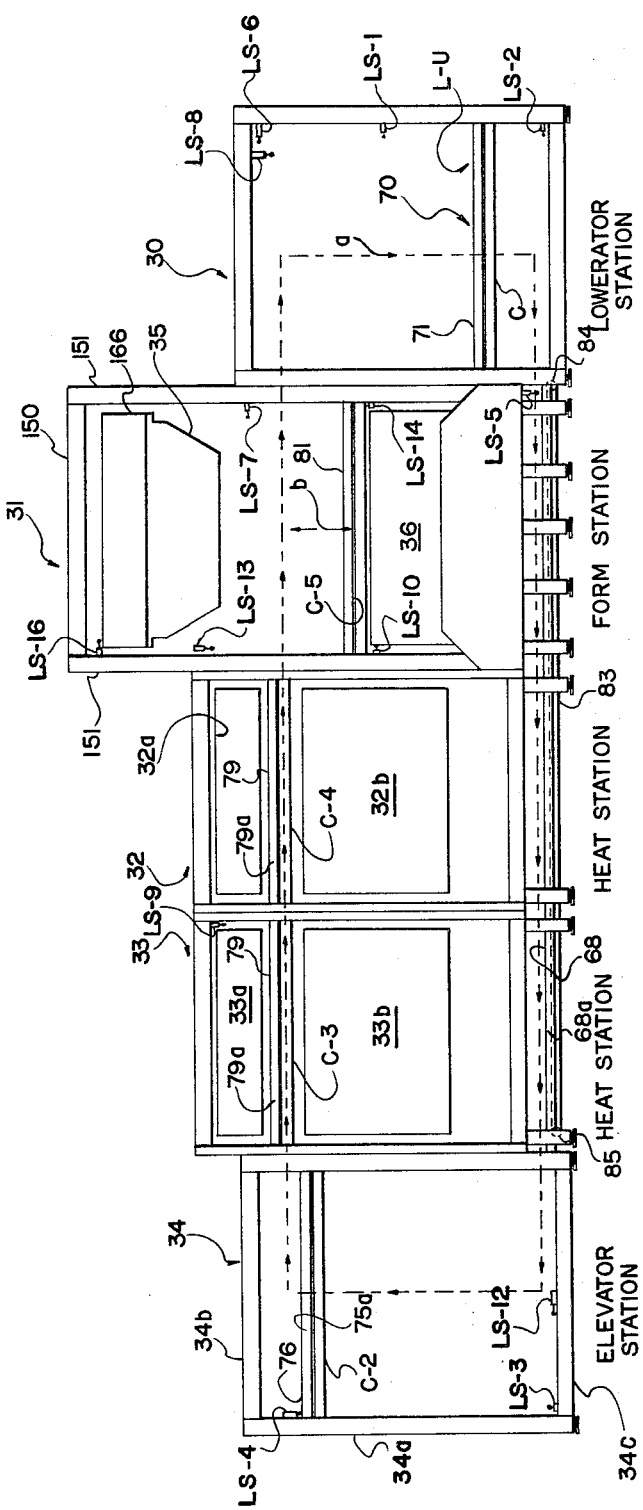
FIG. 2 is a schematic side elevational view with the broken lines and arrows indicating the circuitous path of travel of the plastic sheet carrying carts or frames through the various stages of the machine from the time they are loaded at the Lowerator station at the right end of the view until they proceed back to the Lowerator station and are unloaded.

Referring now more particularly to the accompanying drawings, in which is shown only a preferred embodiment of the invention, attention is first of all directed to FIGS. 1 and 2, wherein the various modules or stages are shown assembled as a unitary machine in which plastic sheets are transported from a loading-unloading station L-U circuitously through the machine and back to the loading-unloading station L-U. In the machine to be disclosed as typifying one form of the invention both loading and unloading are accomplished at a Lowerator station generally designated 30, at the lower end thereof. As will be apparent later on, at the loading and unloading station L-U, a sheet of plastic P is placed on a cart which comprises a clamp frame mounted on transporting wheels, and thence proceeds through the machine circuitously on the cart in the part of travel indicated by the arrows a in FIG. 2. Situated next to the Lowerator station 30 is the forming or mold station, generally designated 31, in which the part to be formed is differential pressure formed in the sheet P, and a mold assembly is provided which, as usual, may include a male mold and a female mold.

Finally, disposed adjacent to the forming station generally designated 31 are a pair of sheet heating stations generally designated 32 and 33, and an elevator station generally designated 34. Each of the stations 30–34 are in effect independent modules in the sense that the framing structure for each is separate and the components or modules 30–34 may be individually shipped, and thence assembled at the site in the relationship shown in FIG. 2. The plastic sheets which are to be molded in the machine, are large in size, on the order of 120 x 300 inches, and of the type which are formed by deep drawing methods into boats, refrigerator cabinet liners, recreational vehicle frames and the like.

As FIG. 2 indicates, the plastic sheet P, which is loaded to a sheet transporting cart at the loading-unloading station L-U at the lower end of the Lowerator station 30, is first moved, in a manner which will be disclosed, beneath the forming station 31, and heat stations 32 and 33 to the lower end of the elevator station 34, in which it is raised as indicated. From the upper end of the elevator station 34, each cart travels through the heating stations 33 and 32, between banks of heating elements which are provided therein to forming station 31. At the forming station 31, the sheet transporting cart is lowered (see the arrow b in FIG. 2) to a molding position in which the cart C–5 is shown, at which point, an upper male mold assembly 35 is brought down to engage the sheet P and assist in moving it into the female mold 36, the sheet P having been brought to a forming temperature in passing through the oven stations 33 and 32, wherein spaced apart upper and lower heater assemblies 33a and 33b, and 32a and 32b, respectively, are disposed.

From the mold station 31 each cart, after first being raised to its former level, is moved across to the Lowerator station 30 and lowered to the loading-unloading station L-U once again. Five carts C–1 through C–5 are shown in the machine and, as will later appear, the carts, when moving along the upper run portion of the path of travel, are linked and move in tandem. While we have schematically illustrated a machine in which both loading and unloading, which can be either manual or automatic, is accomplished at the Lowerator station, it should be understood that machines are contemplated in which loading occurs at the elevator station and unloading only at the Lowerator station. Alternatively, loading and unloading could also occur at a single station at the opposite or elevator end of the machine. With this understanding, then, of the manner in which the sheets P to be formed travel through the machine, the mechanism at the various stations will now be described in detail.

It is to be understood that various conventional, synthetic, thermoplastic plastics such as polystyrene, polyethylene, polypropylene and many others may be suitably formed in machines of the type which will be described.

THE SHEET TRANSPORTING CARTS AND CART SUPPORT TRACKS

Figure 3:
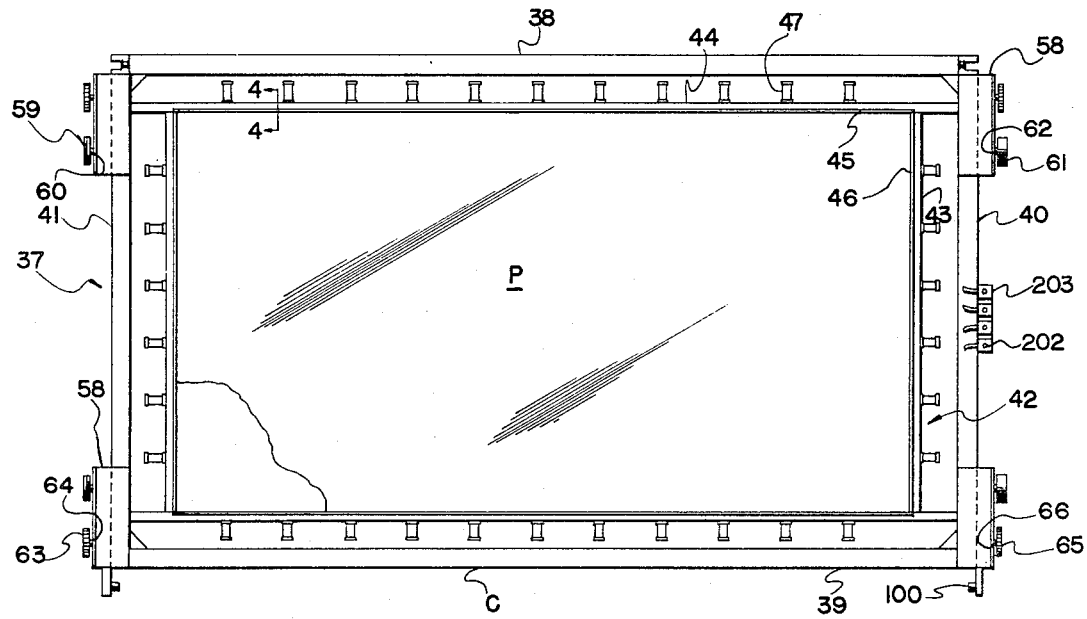
FIG. 3 is an enlarged, top plan view of a sheet transporting cart only, with a plastic sheet to be formed shown clamped in position on the cart frame.
Figure 4:
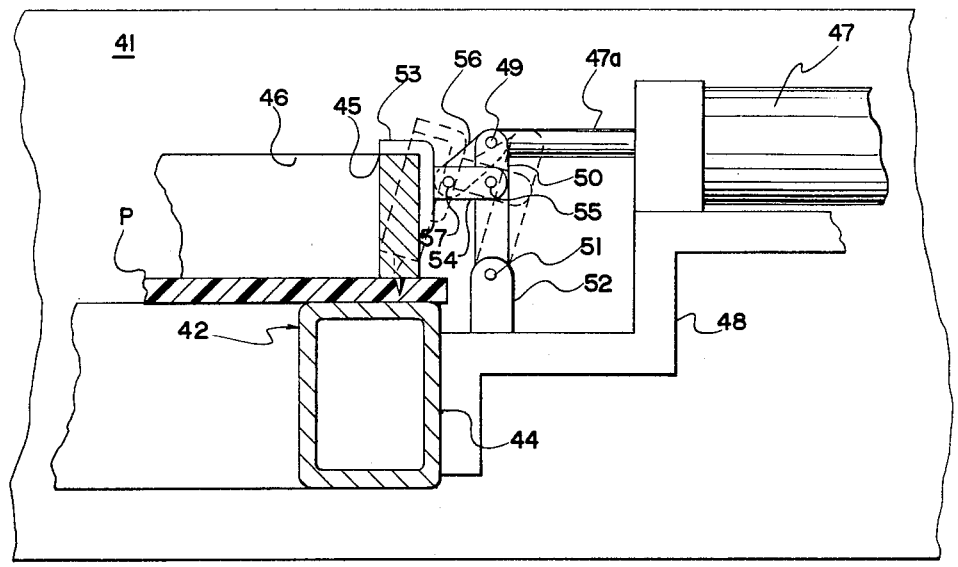
FIG. 4 is a still more enlarged, transverse sectional view taken on the line 4—4 of FIG. 3.

In FIGS. 3 and 4, we have illustrated one of the cars or carts C–1 through C–5, which are being moved circuitously through the machine. It is to be understood that each of the carts is identical and that mechanism is provided for releasably securing the carts together for travel in tandem during a particular portion of their travel through the machine.

As FIG. 3 indicates, each cart comprises a generally rectangular frame, generally designated 37, which comprises outer side members 38 and 39 connected by outer end members 40 and 41. Supported within the outer frame members 38–41, is an inner frame assembly, generally designated 42, which comprises end frame members 43, connecting side frame members 44 which extend to, and are connected to, the outer end frame members 40 and 41. Provided to clamp the plastic sheet P in position on the inner frame formed by members 43 and 44 are separate side and end clamp rail members 45 and 46, respectively, which, as will later appear, are moved from the unclamped position designated by the chain lines in FIG. 4 to the clamped position shown, by a series of operating cylinders 47. The cylinders 47, which are mounted on supports 48 extending from the inner frame 42 are double-acting pneumatic cylinders which are supplied with air under pressure in a novel manner which will later be described.

Figure 6:
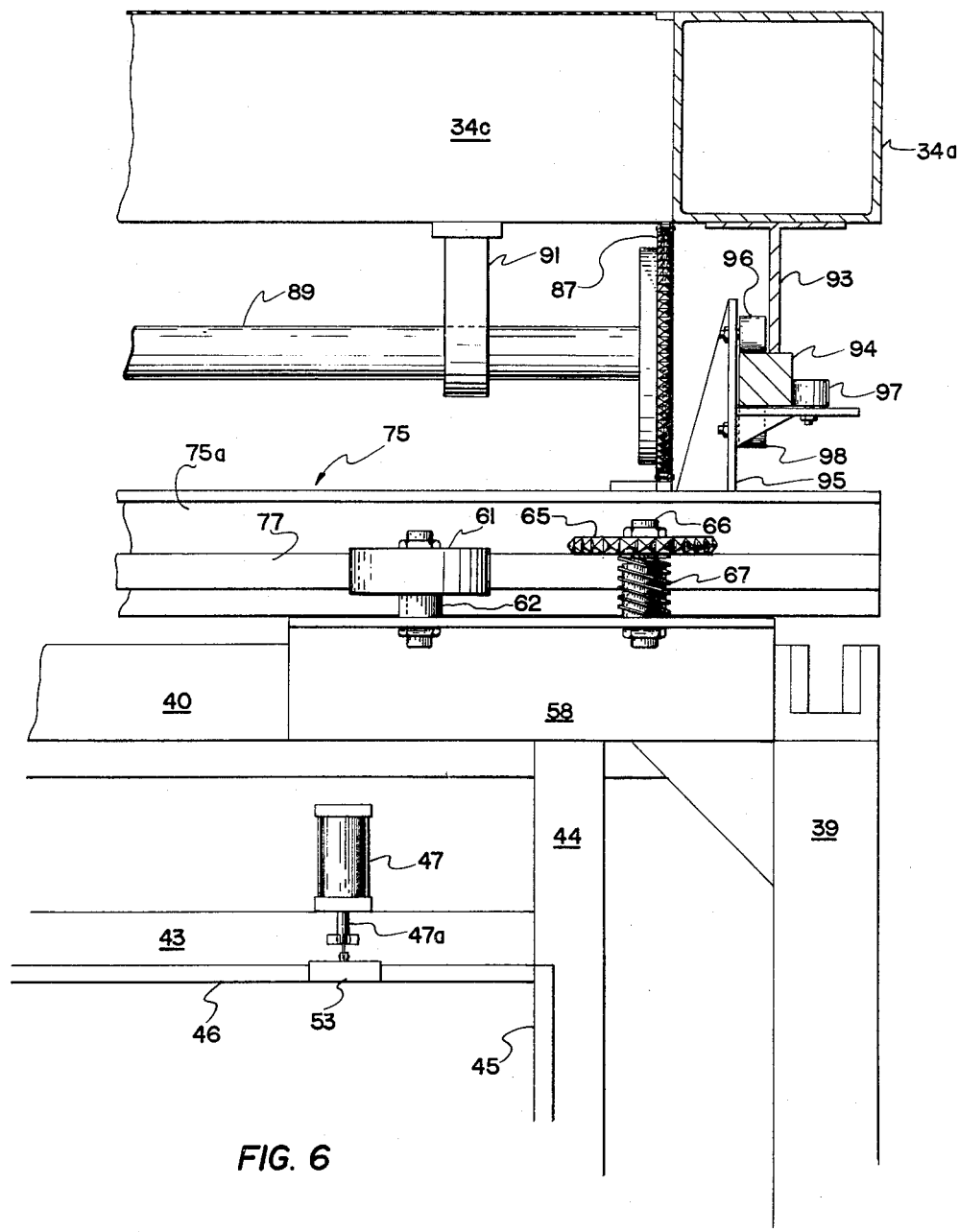
FIG. 6 is an enlarged, fragmentary, sectional plan view taken on the line 6—6 of FIG. 5.
Figures 17, 18:
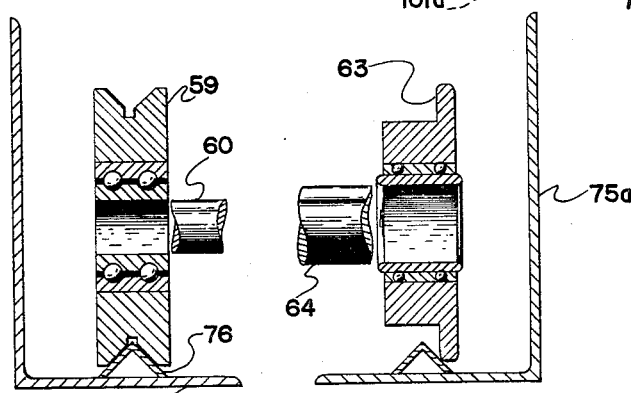
FIG. 17 is an enlarged, fragmentary, sectional view taken on the line 17—17 of FIG. 16.
FIG. 18 is a similarly enlarged, fragmentary, transverse sectional view taken on the line 18—18 of FIG. 16.

As FIG. 4 indicates, each cylinder 47 includes a piston rod 47a, pivotally connected as at 49, with a link 50 which is pivotally connected as at 51 to a support 52 on one of the members 48. Each clamp rail 45 and 46 is operated by a plurality of such cylinders actuated in unison. Provided on rails 45 and 46 are mount members 53 for fixed extensions 54 which are pivotally connected as at 55 to the links 50. In addition links 56, pivotally connected to each pin 49, are pivotally connected as at 57 to the links 54. Plainly, the retraction of the piston rods 47a in FIG. 4 will pivot the members 45 or 46, as the case may be, to the raised inoperative position in which they are shown in FIG. 4 in chain lines, to permit unloading of formed plastic sheet P and reloading of a new sheet P to be formed in the machine. Provided at the ends of each car or cart are wheel mount angle members 58 as shown which are fixed to members 40 and 41. Those at the left end of the cart in FIG. 3, mounts grooved wheels 59 (see also FIG. 17) which are freely spinnable on axles 60, while those at the right end of each car mount non-grooved, flat surfaced, freely spinnable wheel members 61 on axles 62. At the left end of the machine, sprockets 63 are provided on axles 64 and pawl structure mounts the sprockets 63 on the axles 64 such that the sprockets 63 can rotate thereon in but one direction. Similar sprockets 65 are mounted at the right side of the car C with the only difference being that the sprockets 65 are also mounted for limited axial movement on the axles 66, there being spring members 67 (see FIG. 6) which normally bias the sprockets 65 to outermost position on the axles 66. As with the sprockets 63 there is pawl structure (not shown) interposed between the axles 66 and sprockets 65 which permits rotation of sprockets 66 in but one direction of rotation. As FIG. 17 indicates, the wheels 59 are mounted in position to travel on the longitudinally aligned V-track sections 68 which extend along one side of the machine at the lower end thereof from the Lowerator 30 to the elevator 34. At the opposite side of the machine longitudinally aligned flat track sections 69 are provided to support the wheel members 61. Track section 68 and 69 are supported on rails 68a as shown.

At the Lowerator station, a Lowerator cart support frame generally designated 70 is shown as including identical V-shaped track section 71 on a frame member 71a and a flat surfaced track section 72, the track sections 71 and 72 being mounted on frame members 70a which are connected by a cross rail 73. The Lowerator carrier frame 70 is movable vertically on endless chains and in lowermost position the tracks 71 and 72 form continuations of the track sections 68 and 69, respectively. Similarly, at the elevator station 34, an elevator cart carrying frame generally designated 75 is provided which has the same V-shaped and flat surfaced track sections 76 and 77, respectively, mounted on frame members 75a which are joined by a connecting rail member 78. When the vertically movable elevator member 75, which is also endless chain driven, is in lowermost positions, the track sections 76 and 77 similarly align with the track sections 68 and 69 respectively. The carts carried by the carriers 70 and 75, and the various track sections throughout the machine which will be described, are suspended therefrom as FIG. 2 indicates.

Supported by the frame structures for each of the heating stations 33 and 32, at the sides thereof, are upper track sections 79 and 80, on rails 79a, which respectively are the same V-shaped and flat surfaced track sections. Similarly, when the elevator car carrier 75 is raised to vertical position, the V-shaped track 76 thereof will align with the aligned V-shaped track sections 79 which extend through heating stations 33 and 32, while the flat surfaced track sections 77 will align with the identical track sections 80 which extend through both heat stations 33 and 32. At the forming station (see FIG. 11) the same V-shaped and flat surfaced track sections 81 and 82 are provided, which in raised position, the track sections 81 and 82 being vertically movable, align with the track sections 79 and 80 respectively. The track sections 81 and 82 are mounted on rails 81a as before. Similarly, when the track sections 81 and 82 are in uppermost position, and the Lowerator cart carrier 75 is in uppermost position, the tracks 81 and 82 align with the like Lowerator tracks 71 and 72, respectively.

Extending between the Lowerator station 30 and the elevator station 34 at the lower end of the machine and at each side thereof, are endless drive chains 83 (FIG. 2) trained around sprockets 84 at the Lowerator end of the machine, and 85 at the elevator end of the machine. The sprockets 63 and 65 engage, and are driven by, the continuously driven chains 83 and move each newly loaded cart along the track sections 68 and 69 from the Lowerator station to the elevator station, where the elevator cart carrier frame 75 is in lowermost position to receive it.

The elevator station

Figure 5:
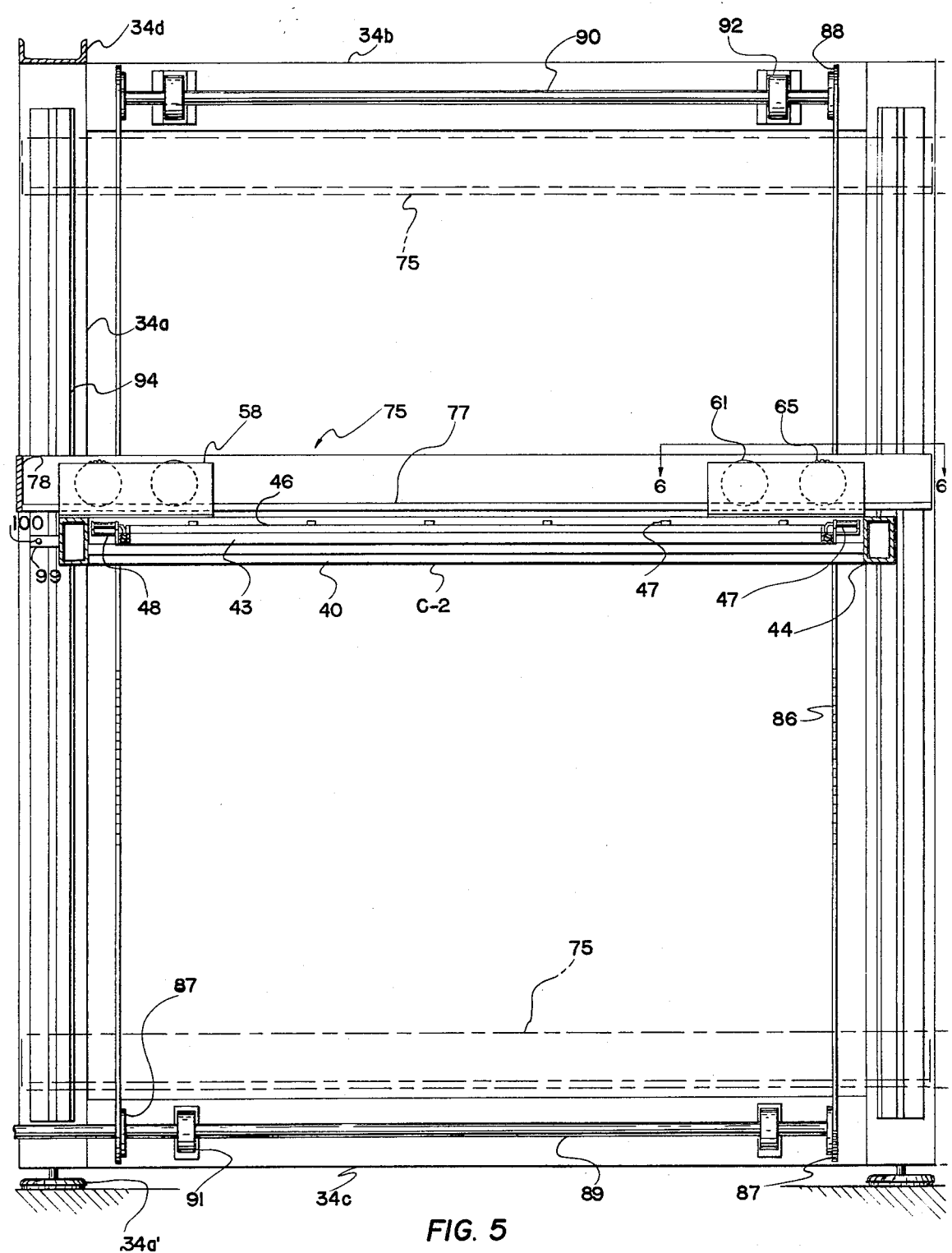
FIG. 5 is a sectional side elevational view showing a sheet carrying cart in the process of being raised at the elevator station, taken on the line 5—5 of FIG. 1.

As FIG. 5 particularly indicates, the elevator station module includes vertical corner post members 34a at each of its four corners, connected at the sides of the machine by upper and lower members 34b and 34c, respectively. The posts 34a are adjustably supported on pads 34a' and also provided is an upper connecting end frame member 34d. Provided to move the carrier frame 75 upwardly and downwardly are longitudinally inner and outer pairs of endless elevator chains 86 trained around lower sprockets 87 and upper sprockets 88, fixed on the ends of lower shafts 89 and upper shafts 90, respectively. The chains 86 may be roller link chains having link brackets to which the carrier frame walls 76 and 77 are fixed. Bearings 91 are provided on the frame members 34c to journal the shafts 89 and bearings 92 are provided on the upper frame members 34b to journal the upper shafts 90. As FIG. 5 shows one of the lowermost shafts 89 may be extended beyond the sprocket 87 and driven by a conventional electric motor at the proper times to effect raising and lowering of the carrier frame 75. Mounted on the interior side of each of the posts 34a (see FIG. 6), is a guide structure including a T-shaped beam 93 having a guide bar 94 thereon. The guide structure extends substantially from the upper end of the elevator station to the lower end thereof. Provided on gusset plates 95 connected to each elevator car carrier 75 are guide rollers 96, 97 and 98 which as shown guide on the members 94. It is to be understood that identical guide structure is provided at each of the four corners of the elevator station frame to maintain the alignment of the car carrier frame 75 as it moves vertically in a reciprocatory path in the elevator station.

Figure 15:
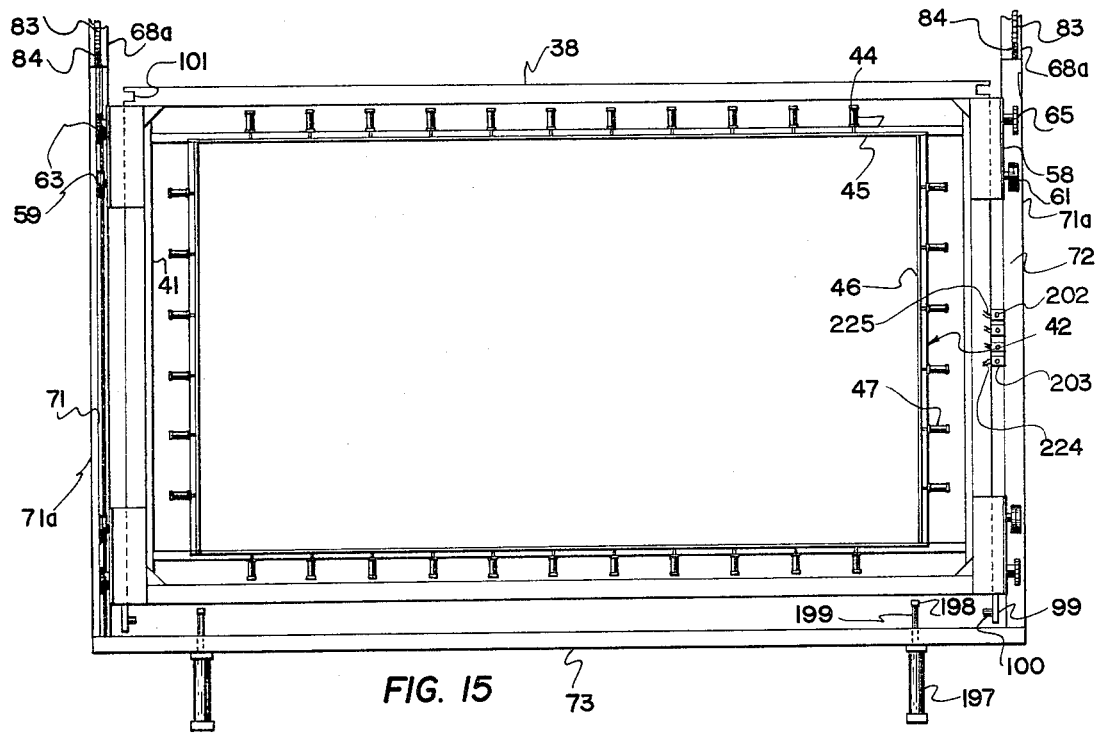
FIG. 15 is an enlarged, fragmentary, top plan view showing a sheet carrying cart at the Lowerator station, with the sheet to be formed, however, omitted from the view.
Figure 16:
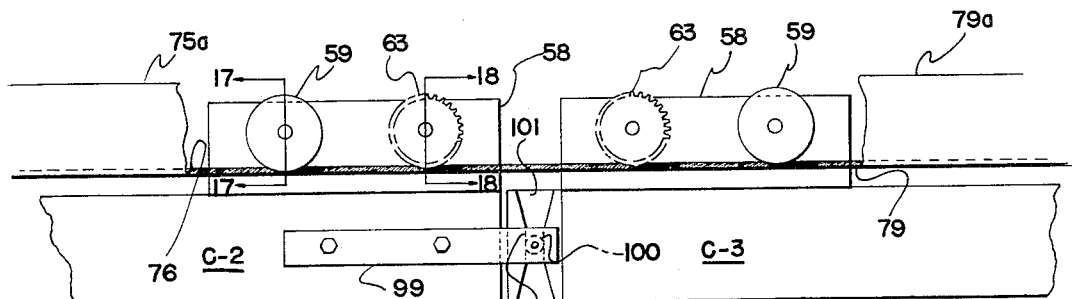
FIG. 16 is a still further enlarged, fragmentary, side elevational view showing the manner in which the carts are releasably connected together at the elevator, heating and forming stations to travel in tandem.

As FIGS. 15 and 16 particularly show, the cart members at one side mount extension bars 99 with freely rotatable, laterally inwardly projecting rollers 100 journaled thereon. At their opposite ends, the cars are provided with generally hour glass-shaped recesses 101 which are formed to receive the rollers 100. As FIG. 16 particularly shows, the notches 101 include an intermediate portion 101a of a size to snugly accommodate the rollers 100. At the upper end of the machine at the elevator station 34 and first heat station 33, the elevator car transport frame 75 brings a cart to uppermost position, prior to the time the preceding cart is moved to the heating station 32. In so doing, it raises the succeeding cart on the elevator carrier 75 sufficiently so that the rollers 100 on the extensions 99 thereof pass up into the notches 101 on a cart in heating station 33 and become lodged in the notches 101 in the manner indicated in FIG. 16. Carts which are hooked together in tandem in this manner will then subsequently proceed as a unit along the upper rails or tracks through heat stations 33 and 32. At any one time four such cars will be hooked together and traveling in tandem along the upper part of the machine. The movement is not continuous because, as will later appear, there is a necessary pause or dwell period, during which time the car at the forming or molding station is disconnected and lowered to the female mold assembly 36, prior to being raised and reconnected so that the hooked-together cars can travel another car length along the upper portion of the machine.

The heating stations

For purposes of convenience, the heater station 32, rather than the heater station 33, which is adjacent elevator station 34, will be now described. As FIGS. 7–10 particularly indicate, the heater station 32 includes a frame assembly, generally designated 102, which is mounted on legs 103, similarly supported on vertically adjustable pads 103a, and includes vertical corner post members 104 connected at their upper and lower ends by side frame members 105 and 106 and end frame members 107 and 108. Intermediate frame members 109 support the framework, generally designated 110, for supporting reflector panels 111 forming a reflector panel enclosure which is open at its upper end, the panels 111 being braced by framework 112 and 113. A table structure generally designated 114 is provided for supporting the electrically powered heater elements 32b, and may be vertically adjusted in a manner not disclosed with respect to the reflector panel enclosure. At the upper end of the frame assembly, cross frame pieces 115 may be provided to support the upper heater member 32a in stationary position. A similar reflecting enclosure including side members 116, and open at its lower end, is provided for the upper heater member 32a.

Supported inboard of the track sections 79 and 80, which are mounted on beams 79a are guide rail assemblies (see FIGS. 7 through 9 particularly) generally designated 117. Each assembly 117 includes end plates 118 connected by upper and lower side members 119 and 120. Provided within the structure thus formed, and on each side thereof, are side bars 121 to which are connected vertically spaced plates 122 and 123 which together define a longitudinally extending guide channel 124 for a purpose which will later be described. At each end of each structure 117 are shafts 125, journaled in bearings 126 mounted on the members 122, the shafts 125 mounting sprockets 127 at one end of the station, and 128 at the other end, around which a reciprocating endless chain 129 is trained. As shown particularly in FIG. 7, one of the shafts 125 (see the left end of the view) may be driven by a sprocket 129a from an output sprocket 130 provided on a suitable electric motor 131 via a chain 132. The motor-driven shaft 125 also extends across the machine to drive the sprocket 128 for the chain 129 at the opposite side of the machine. Each chain 129 may be a conventional roller chain to which a releasably cart gripping block assembly 133 is connected as shown in FIG. 8. Each block mounts transversely extending guide pins 134a and roller members 135a which, as FIG. 8 shows, are received within the guide slots 124 in the structures 117. It is to be understood that the block assemblies 133 are capable of releasably gripping a cart and that the chains 129 will then advance the blocks 133 to move the particular cart, and those carts which are being conveyed in tandem with it, a cart length. Adjacent each of the notches 101 at the one side of each cart, a freely rotatable roller 134 is provided, mounted on a support 135 on the member 38 at each end. The lower end of the block 133 at each side of the machine is provided with a recessed portion or trap 133a, as shown, within which a roller 134 may be received. Pivotally mounted on each block member 133 as at 136a is a lever 136 which includes a spring well 137. A similar spring well 138 is provided in each block 133 and the coil springs 139, received in the walls 137 and 138, normally force the levers 136 to the position in which the lever is shown in FIG. 8. The stop bar 140 provided on each block 133 as shown, is in position to prevent further outward urging of the block levers 136 about pivots 136a.

Figure 7:
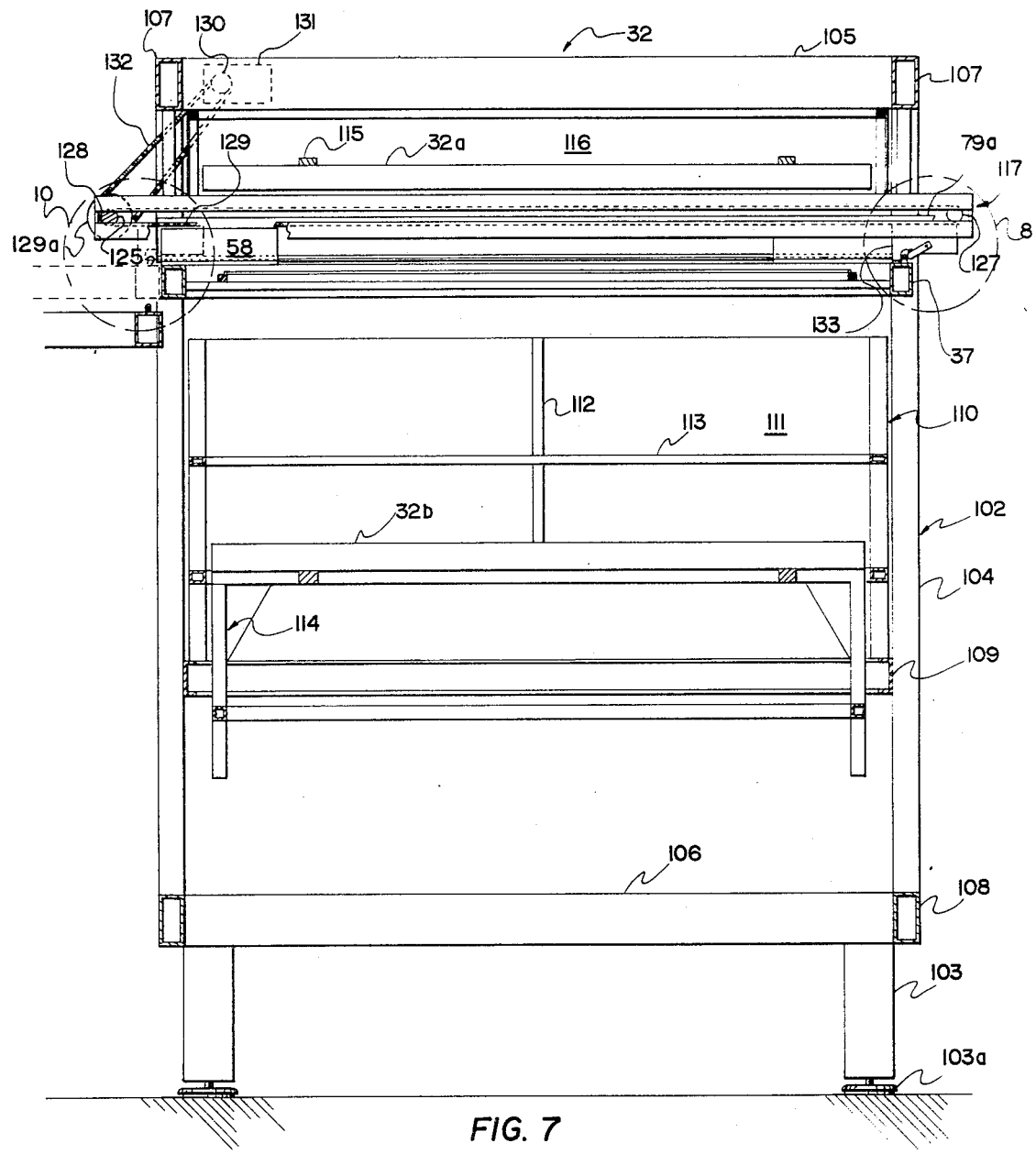
FIG. 7 is a fragmentary, sectional, side elevational view taken at one of the heating stations and showing the manner in which the linked sheet transporting carts are gripped and moved along the upper run of the circuit traveled.
Figure 8:
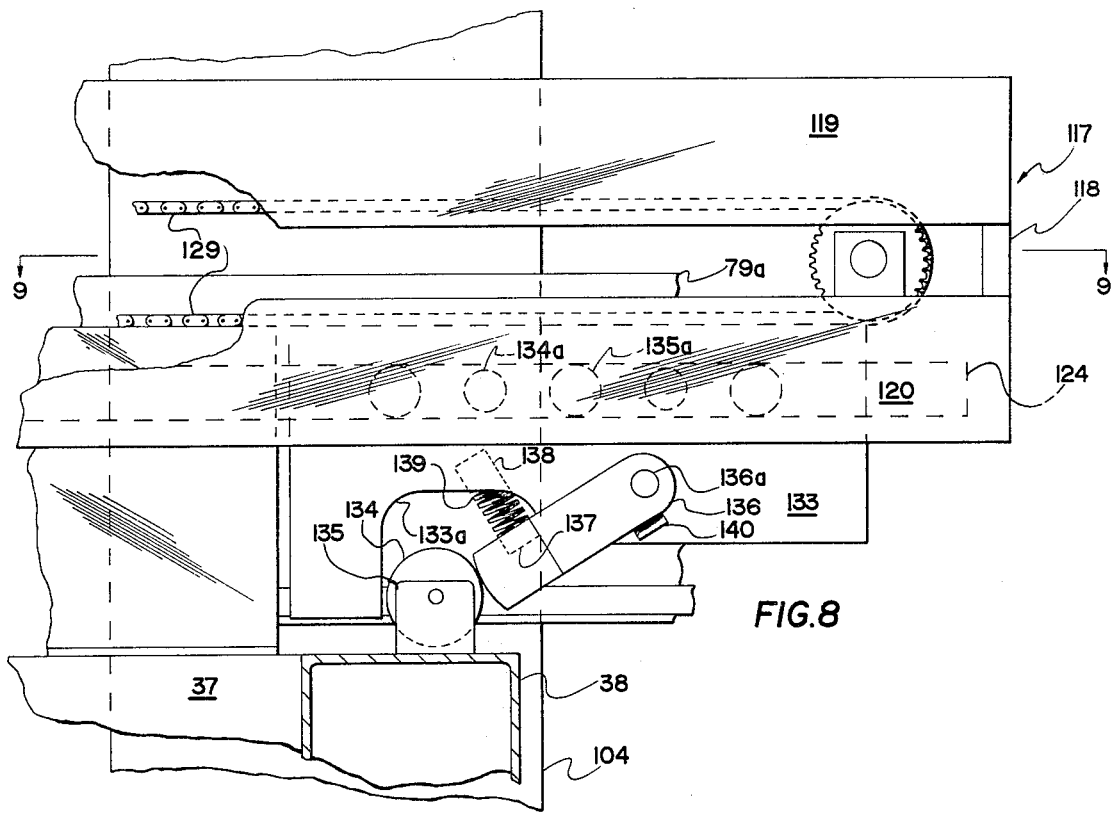
FIG. 8 is a greatly enlarged view better illustrating the releasable gripping mechaism identified by the circle 8 in FIG. 7.
Figure 9:
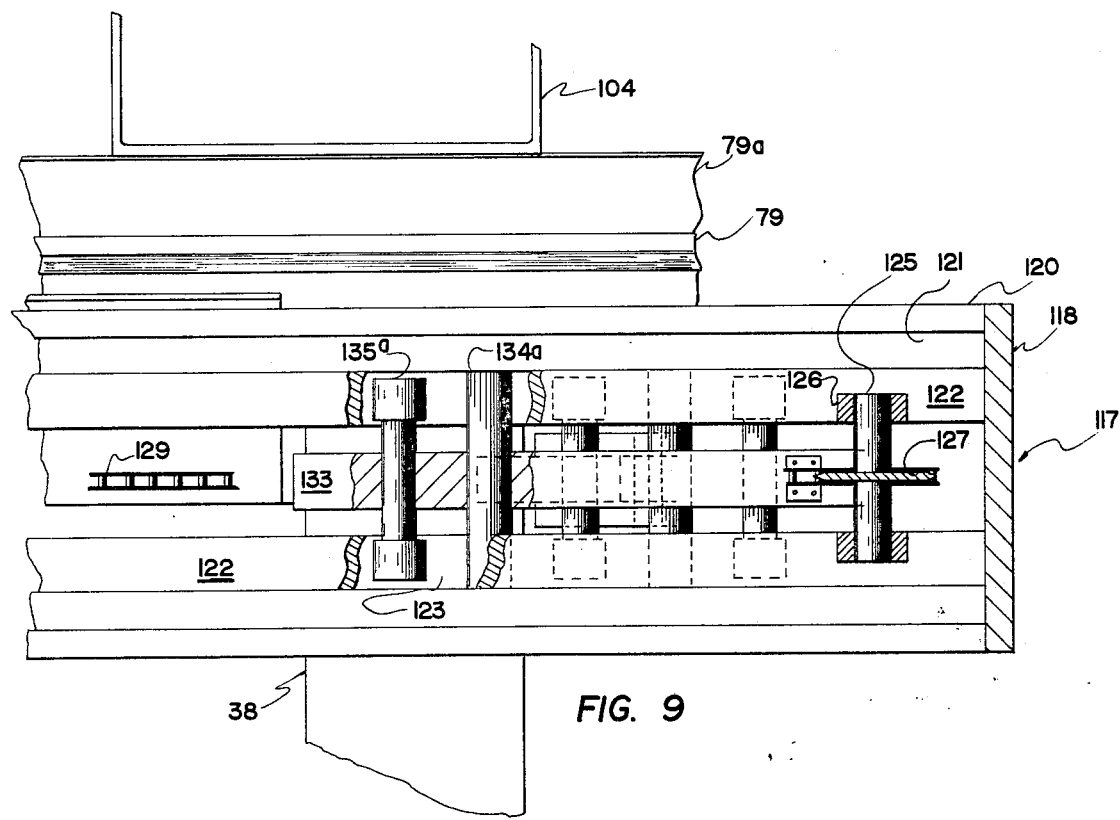
FIG. 9 is a fragmentary, sectional plan view taken on the line 9—9 of FIG. 8.

When the support blocks 133 are being returned to the right in FIG. 7, after having advanced a cart to the left to the mold station, the levers 136 will ride over the rollers 134 on the cart disposed in the heat station 32 and will be pivoted upwardly. When blocks 133 have traveled far enough, the levers 136 will be permitted to pivot outwardly and will trap the rollers 134 in the recesses 133a in the manner shown in FIG. 8, so that the chains 129 are again in position to advance the cart now in the heat station 32.

It is to be understood that the heat station 33 is of exactly the structure of the heat station 32, except that no guide structures 117, chains 129, or blocks 133 and their correlative structure are provided. Of course, when the blocks 133 have conveyed the cart in station 32 all the way into the forming station 31, they may not return to position until the particular cart in the forming station has been vertically lowered in a manner which will be described and thereby become disengaged from the locking recesses 133a.

The forming station

Figure 11:
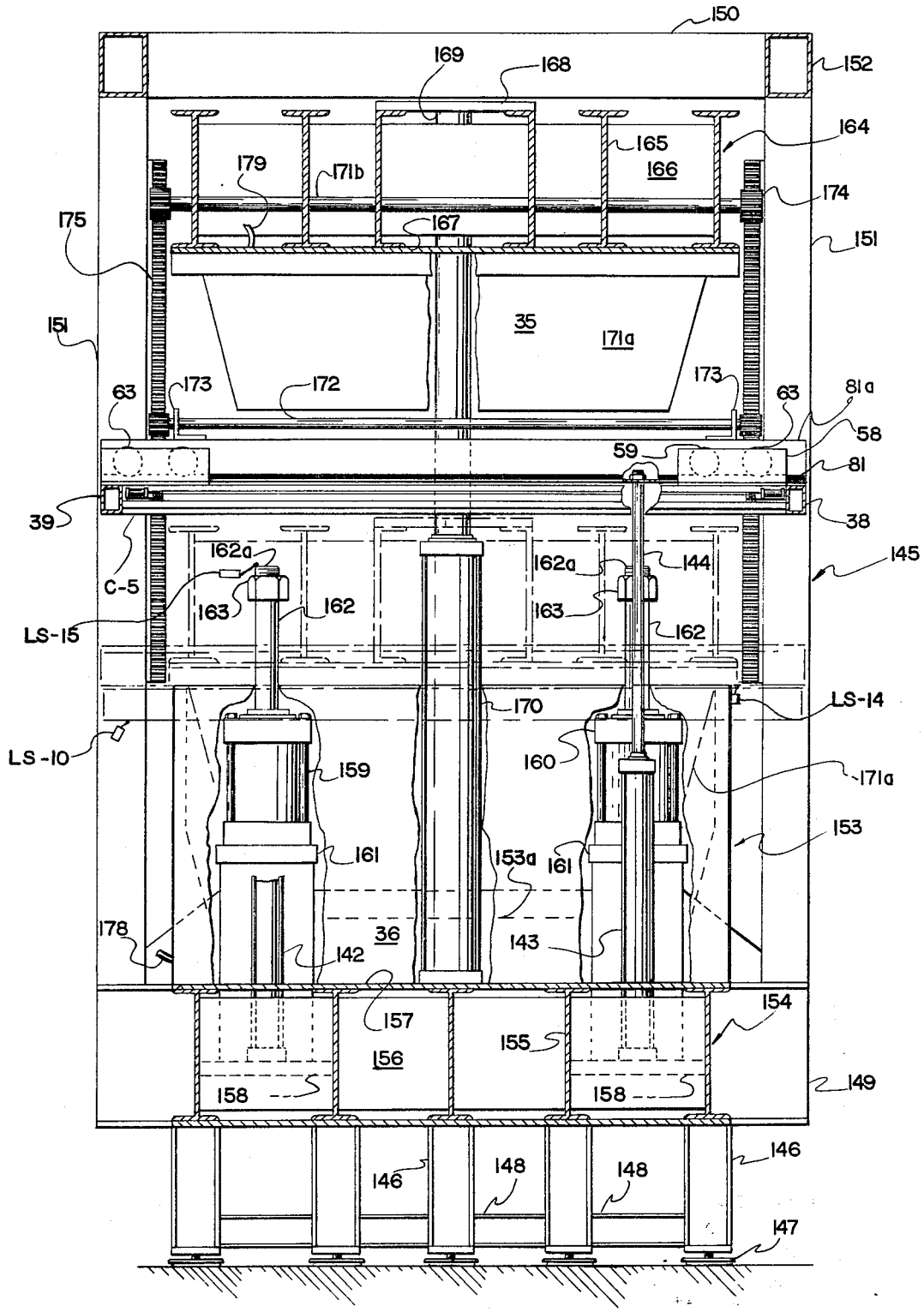
FIG. 11 is a fragmentary, sectional, side elevational view taken at the forming station with the molds shown in the inoperative separated position, chain lines also indicating the lowered position of the upper platen, a plastic sheet carrying cart, and support tracks for the cart, the view being taken on the line 11—11 of FIG. 1.

When a car is moved across from the heating station 32 to the forming station 31 in the tandem movement described, it moves from the track sections 79 and 80 on rails 80a onto the track sections 81 and 82 on the rails 81a at the forming station, which, as FIG. 11 indicates, are independently supported by pairs of double-acting solenoid actuated pneumatic cylinders 142 and 143 respectively. The cylinders have piston rods 144 connected with the rails 81a. At a designated time the cylinders 142 and 143 are operated to lower the rails 81a supporting track sections 81 and 82, and thereby the car C supported thereon, in a manner which will be described.

As FIG. 11 indicates the frame structure at the forming station which is generally designated 145, includes supporting legs 146 mounted on adjustable pads 147 and beams 148, which connect the legs 146. Channel beams 149 are fixed to the legs 146 at the lower end of the structure and are connected to upper support beams 150 by vertical beams 151 at the four corners as shown. In addition, at the upper end of the structure cross-beams 152 are provided to connect the longitudinal beams 150.

The female mold assembly 36 includes a fixed support bed 154 for the stationary, releasably secured female mold, generally designated 153, which is provided with the usual mold cavity 153a. The bed 154 includes transversely extending I-beams 155 connected by spacer plates 156 and a top support plate 157. The cylinders 142 and 143 are mounted on cylinder support plates 158 which also mount pairs of double-acting solenoid operated cylinders 159 and 160 as shown on pedestals 161. The piston rods 162 for the cylinders 159 and 160 are free at their outer ends as shown in FIG. 11 and are threaded as at 162a to receive nut members 163 for a purpose which will later be described.

As noted, it is the female mold 153 which is stationarily supported and, also provided, is a vertically movable upper platen, generally designated 164 and constituting a portion of the male mold assembly 35, which comprises transversely extending I-beams 165 connected by spacer plates 166 and a lower plate member 167. The two central I-beam members 165 are connected by a cross plate 168 which is fixed to the piston rod 169 of a double-acting solenoid actuated upper platen raising and lowering pneumatic cylinder 170 fixed to the plate 157, and male mold 171a may be releasably fixed to the upper platen plate 167 in the usual manner.

When the cylinder 170 is operated to lower the upper platen 164 and the male mold 171a from the position shown in solid lines in FIG. 11 to the position shown in chain lines, to dispose the male mold 171a in the mold cavity 153a, the mold 171a is maintained in vertical alignment by a guide structure which includes vertically spaced pairs of shafts 171b and 172 journaled by the beams 165 and angle bearing members 173 mounted on the guide tracks rails 81a as shown. Mounted on the ends of the shafts 171a and 172, are pinion gears 174 which are in mesh with, and travel along, stationary rack gears 175 which can be fixed to the vertical frame members 151.

Figure 12:
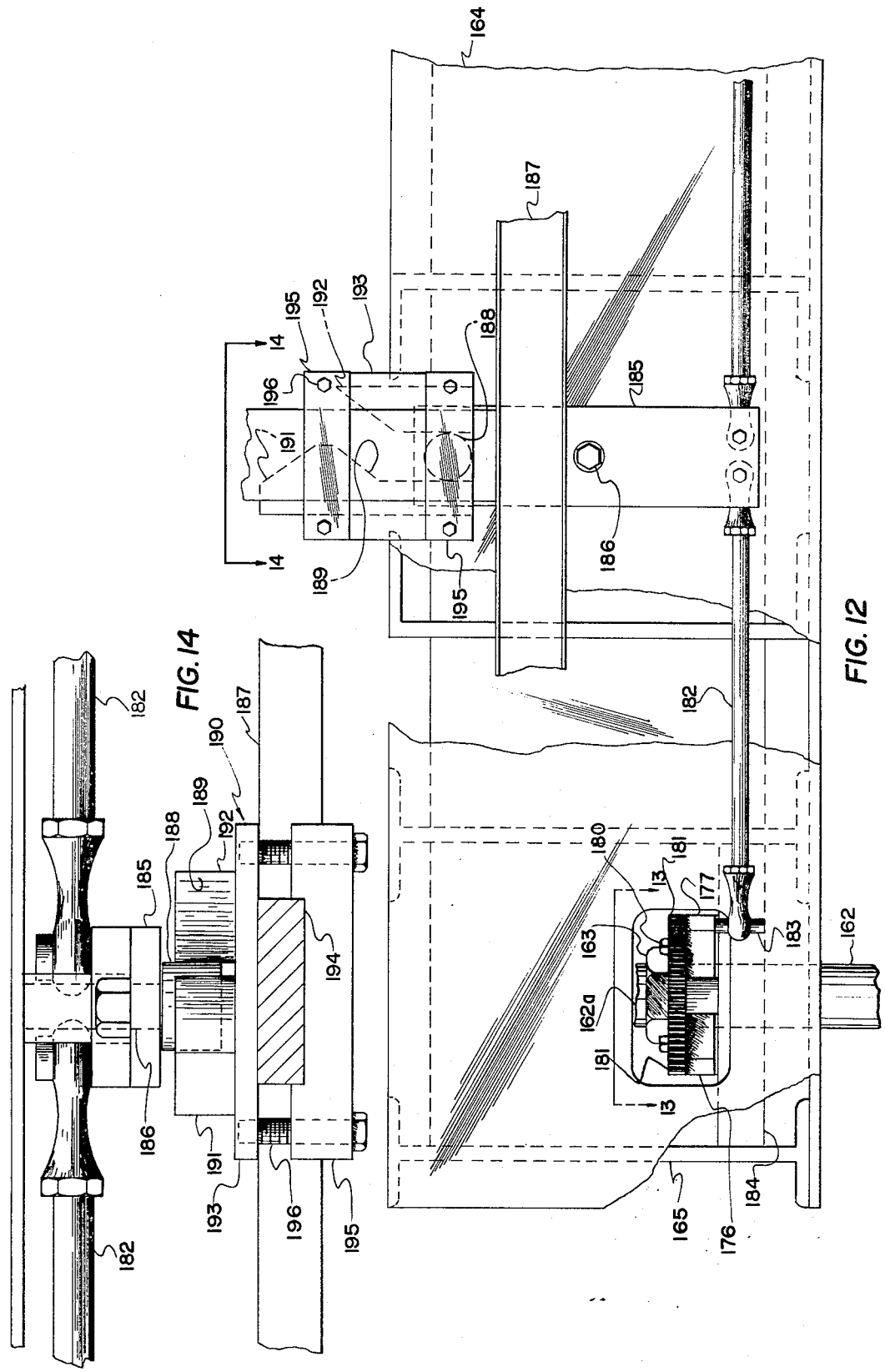
FIG. 12 is an enlarged, fragmentary, side elevational view illustrating the manner in which the upper mold assembly is clamped to the lower mold assembly during the forming operation.
Figure 13:
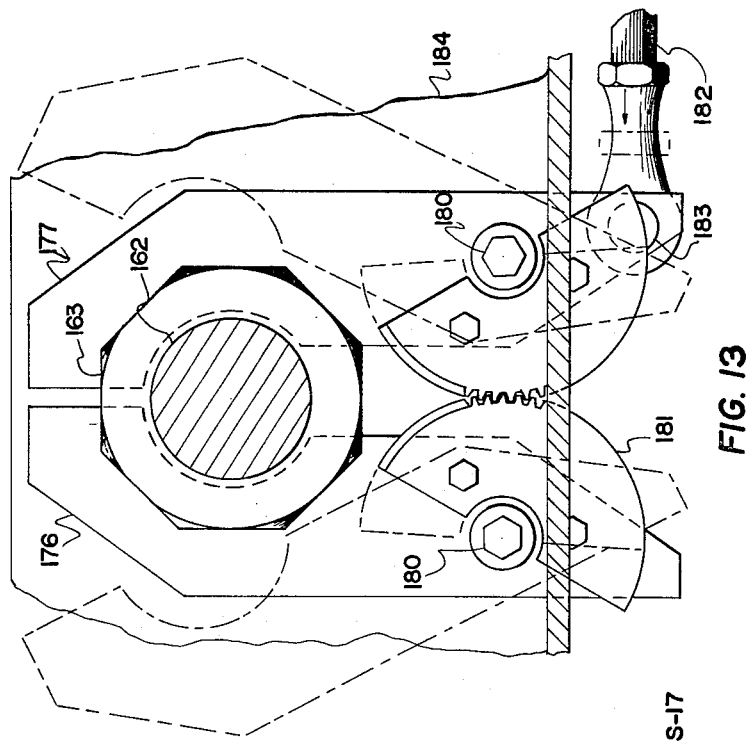
FIG. 13 is an enlarged, fragmentary, sectional plan view taken on the line 13—13 of FIG. 12.

Provided on opposite sides of the upper platen 164 to cooperate with each of the piston rods 162 of cylinders 159 is an upper platen clamping structure which is particularly illustrated in FIGS. 12 through 14. When the upper platen 164 is lowered to the position in which it is shown in chain lines in FIG. 11, clamp jaws 176 and 177 are actuated to the closed position around piston rods 162 in which they are shown in FIG. 13 from the spread-apart position indicated by the chain lines in FIG. 13. When the jaws 176 and 177 are in closed position under the nuts 163, pressure exerted by the cylinders 159 and 160 to move the rods 162 downwardly will bias the jaws 176 and 177 in a downward direction and accordingly pull the upper platen 164 downwardly. The force exerted is sufficient to more than overcome the differential pressure tending to separate the dies or molds 171a and 153 during the forming operation. It is to be understood that the female mold 153 may, in the usual manner, be connected with a suitable source of suction, such as a suction pump by a vacuum hose 178, and the male die 171a with a suitable source of air under pressure via the conventional flexible air hose 179 in the usual manner.

As FIG. 13 particularly indicates each of the jaws 176 and 177 is pivotally mounted as at 180 and has a segment gear 181 fixed to its upper side. The gears 181 on the respective jaws 176 and 177 are in mesh so that a pivotal movement exerted upon the jaw 177 by a connecting rod 182, which is pivotally connected to the jaw 177 as at 183, will also pivot the jaw 176. Provided to furnish sliding support for the jaws 176 and 177 at each corner of the upper platen 164 are cross plate members 184 which extend from one end of the upper platen 164 to the other, and which also as shown mount the jaw pins 180.

To operate the pairs of jaws 176 and 177 at opposite ends of the upper platen 164, a rock plate 185 is provided which is pivotally centrally connected as at 186 to the platen 164. The rock plate 185 at each side of the machine is operated by a cam structure which, in the manner indicated, is supported on a beam 187 fixed to the frame structure members 151. Projecting from each rock plate 185 is a freely rotatable follower roller 188 which is received in. and then rides in, a cam track 189 as the upper platen 164 moves downwardly at the lower portion of the travel of the upper platen assembly 164. The cam tracks 189, which are formed in a cam assembly generally designated 190 mounted at each side of the machine, are formed by spaced apart plates 191 and 192 which are supported on a plate 193. To permit vertical adjustability, the plate 193 is releasably clamped to a vertically extending slide plate 194 fixed to frame beam 187 by pairs of clamp plates 195, and clamp bolts 196.

Figure 10:
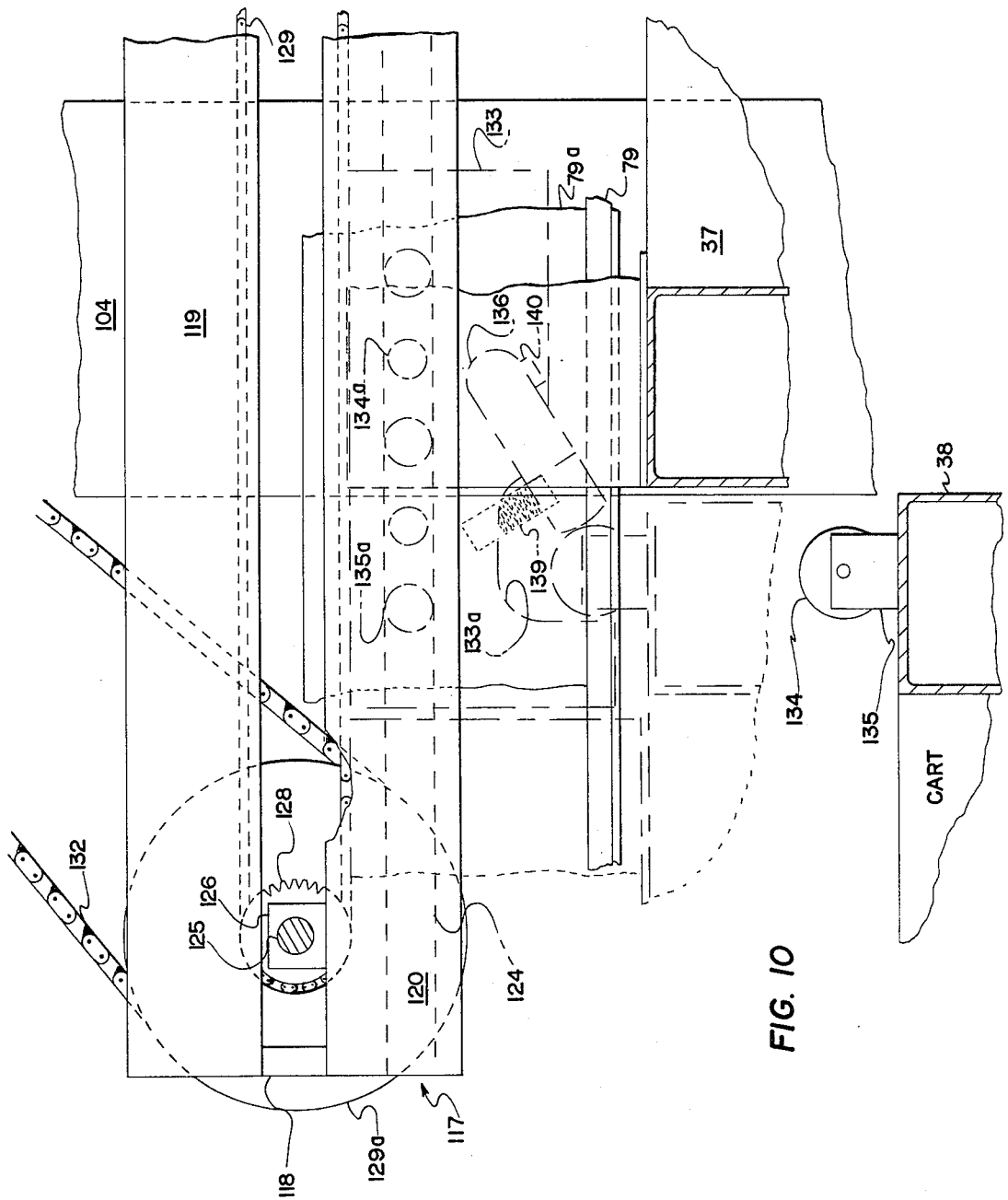
FIG. 10 is an enlarged, sectional view illustrating the mechanism within the circle 10 in FIG. 7.

As will later appear and as FIG. 10 particularly indicates, when the track sections 81 and 82 are lowered, the roller members 134 on the cart, which is supported on the track sections 81 and 82, lower out of the locking recesses 133a and so disengage from the cart immediately behind them in the heating station 32. Later, after forming has been accomplished, the cart in the forming station moves up to engage its rollers 100 in the recesses 101 of the adjacent cart in the heating station 32. In the interim, block carriages 133 have been returned to original position adjacent heating station 33 and become engaged with rollers 134 of the cart in station 32.

The Lowerator structure

It is to be understood that the Lowerator structure 30 is virtually identical with the elevator structure 34, which is particularly shown in FIG. 5, and includes the same frame structure and endless chains 86 on sprockets 87 mounted on shafts 89 and 90. In the case of the Lowerator station, the chains 86 mount the carrier 70 rather than the carrier 75 and similar guide structure is provided to maintain the vertical alignment of the carrier 70 in its vertical path of travel. In the case of the Lowerator however, as FIG. 15 indicates, kicker cylinders are provided on the carrier 70 to move the cart C initially to the left as viewed in FIG. 2 after the cart C has been fully lowered to move the sprockets 63 and 65 over into engagement with the drive chains 83. The kicker cylinders 197 have striker pads 198 mounted on their piston rods 199 which, in FIG. 15, are shown in the retracted position. No such kicker cylinders 197 are necessary at the upper end of the elevator station inasmuch as the elevator carrier 75 moves a cart up into an engaged position with the immediately preceding cart such that it is trapped for movement in tandem with it in the manner indicated in FIG. 16.

Figure 19:
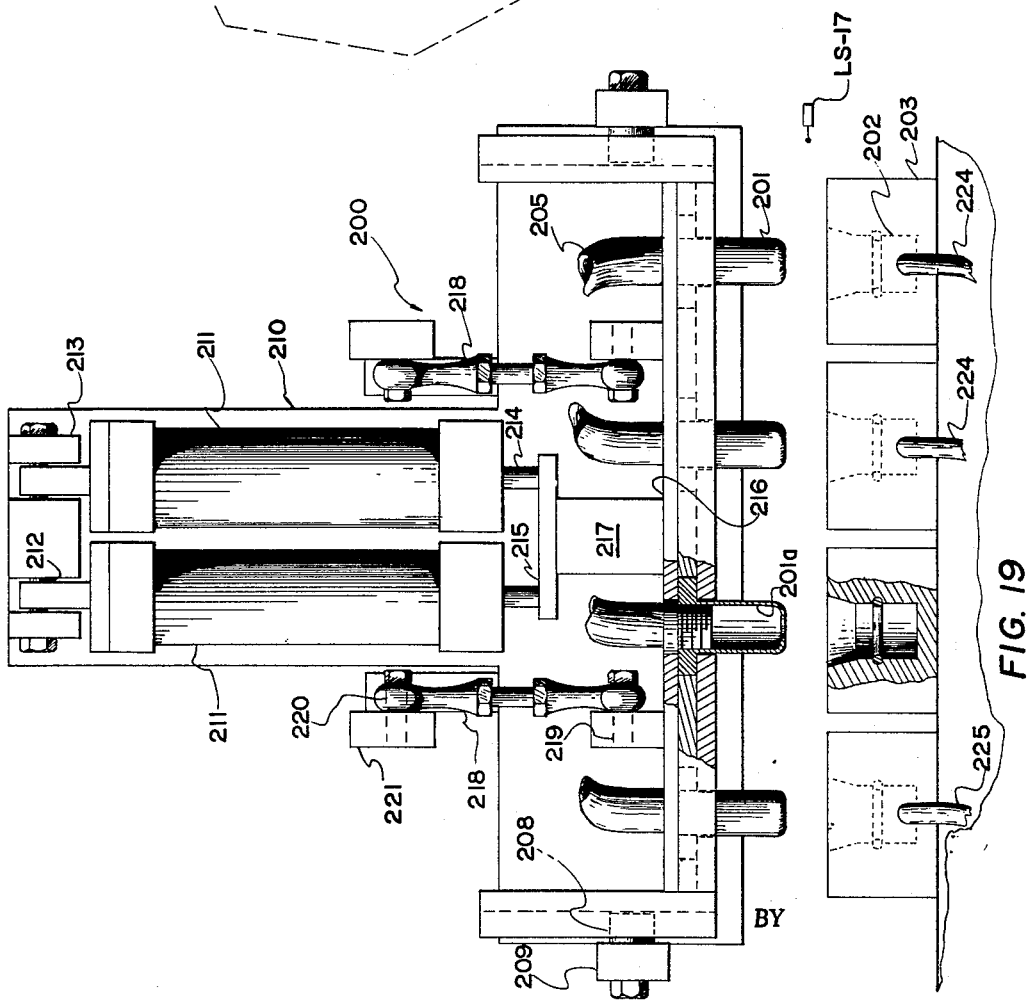
FIG. 19 is an enlarged side elevational view illustrating only the mechanism for supplying air under pressure to power the sheet clamping cylinders at the Lowerator station.
Figure 20:
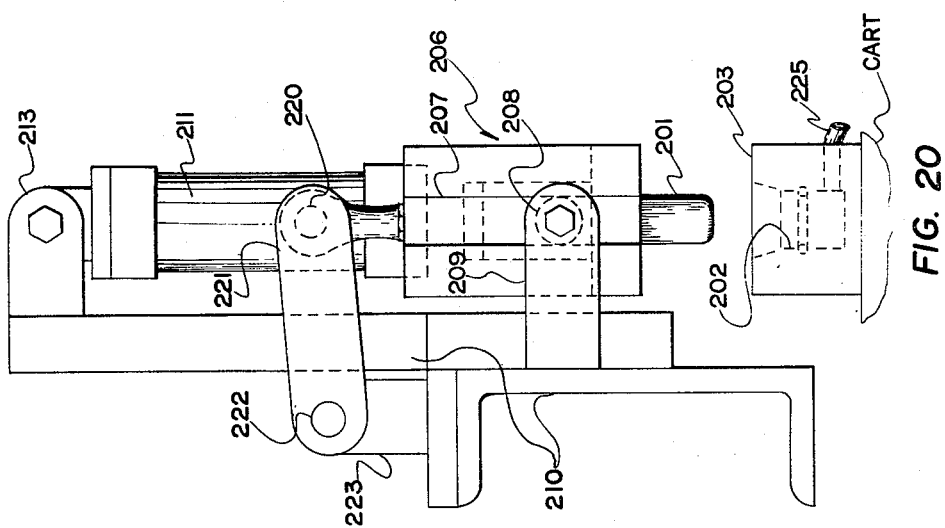
FIG. 20 is an end elevational view thereof.
Figure 21A:
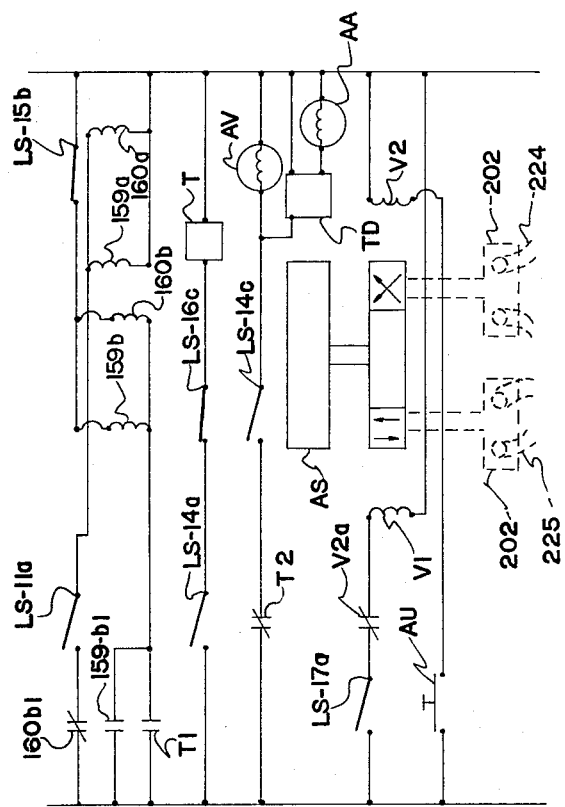

FIGS. 1, 19 and 20 show the mechanism for supplying the desired air under pressure to power the sheet-clamping cylinders 47. Located at the Lowerator station, in position to inject air under pressure, is an air injection assembly, generally designated 200, including nozzles 201 which are receivable in sockets 202 provided in members 203 which are mounted on each cart C–1 through C–5 (see FIG. 3). Each of the nozzles 201 includes a port 201a communicating with a n air pressure supply hose 205 connected to an air supply source such as a compressor through a valve system which alternately may supply either the left two nozzles 201 shown in FIG. 19, or the right two nozzles 201. If the left two nozzles in FIG. 19 are being supplied with air under pressure they will move the piston rods 47a of the piston 47 forwardly to clamp a plastic sheet P in position in the manner shown in FIG. 4. If the right two nozzles 201 are being supplied with air under pressure, it will be supplied to the opposite ends of cylinders 47 and the effect will be to retract the piston rods 47a and swing the clamp frame members 45 and 46 outwardly and upwardly so that the plastic sheets P may be removed. Once the clamp frame members 45 and 46 are moved to clamped position, the linkages 50–55 (FIG. 4) hold them in this position and the fact that the air pressure in cylinders 47 is dissipated, when the nozzles 201 are removed from sockets 202 so that the cart can proceed through the machine, is immaterial.

The unit 200 which is mounted in position by one of the Lowerator carrier rails 71a includes a vertically moving head generally designated 206 on which the nozzles 201 are mounted. As FIG. 20 indicates, the head 206 includes side guide grooves 207 in which guide rollers 208 mounted on brackets 209 which extend from the support frame 210 are provided or received. The frame 210 is supported on the Lowerator carrier 70 in the manner indicated in FIG. 1. Head operating cylinders 211 which are pivotally mounted on a pin 212 supported by ears 213 provided on the frame 210, have piston rods 214 connected to a cross piece 215, which is connected by a block 217 with the plate 216 on which the nozzles 201 are mounted. Also connecting rods 218, pivotally connected to the head frame 206 as at 219, are pivotally connected at their upper ends as at 220 to guide arms 221 which are pivotally connected at 222 to supports 223 on the frame 210. The connecting rods 218 act as stabiilzers and tend to assure the aligned vertical travel of the head 206. Flexible hoses 224 connect the right two sockets 202 with the left or inner ends of cylinders 47 in FIG. 4 and flexible hoses 225 connect the left two sockets 202 with the right or outer ends of cylinders 47 in FIG. 4.

The control circuit

Figure 21:
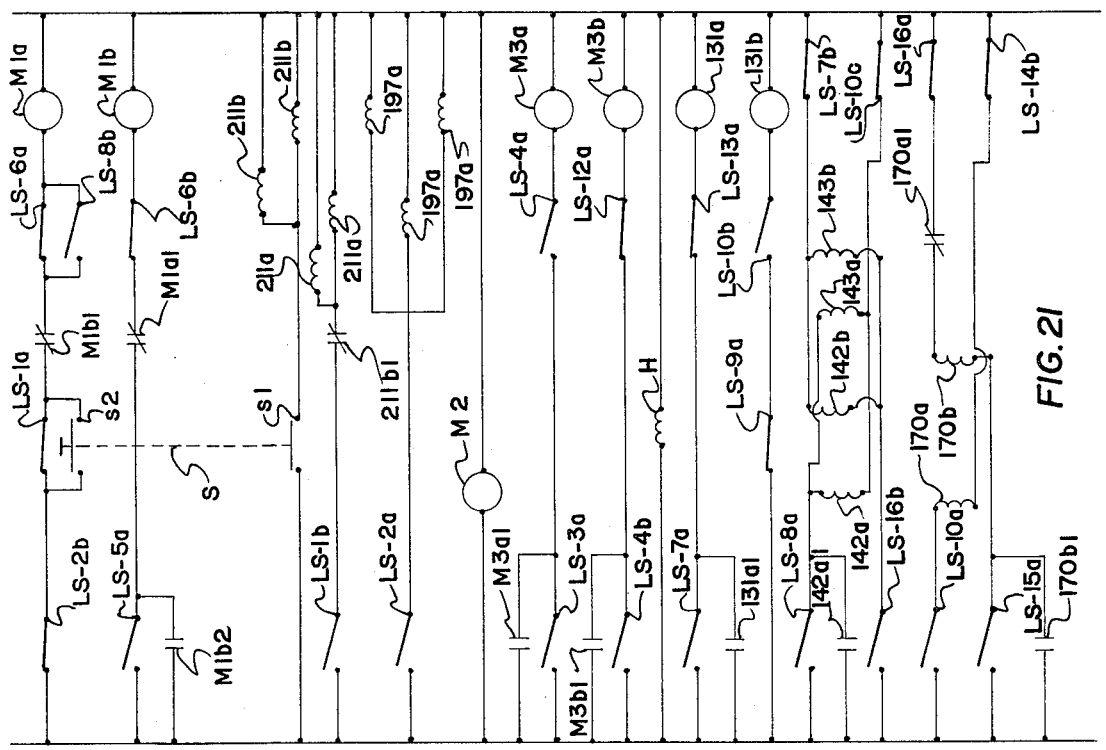
FIGS. 21 and 21a are schematic diagrams of a typical electrical control circuit for operating the apparatus illustrated in FIGS. 1–20.

A schematic diagram of a typical electrical control circuit for operating the apparatus illustrated in FIGS. 1–20, is illustrated in FIG. 21 and includes a pair of lines L–1 and L–2 connected across a suitable source of power such as 110 volt, 60 cycle, alternating current. Located at the mid-portion of the Lowerator 30 is a limit switch LS–1 which includes a set of normally closed contacts LS–1a which are opened when the limit switch LS–1 is actuated by a cart being lowered in the Lowerator 30. At the lower portion of the Lowerator 30 is a limit switch LS–2 including sets of normally open contacts LS–2a and normally closed LS–2b which are closed and opened respectively when the limit switch LS–2 is actuated by a cart moving downwardly in the Lowerator station. A limit switch LS–6 is mounted adjacent the upper portion of the Lowerator station 30 and is actuated when the carrier 70 is returned to the upper position to open sets of normally closed contacts LS–6a and LS–6b. The starting windings for driving the reversible motor M–1 in a direction so as to lower and raise the carrier 70 are shown at M1a and M1b respectively. The winding M1a, when energized, is operable to open a set of normally closed contacts M1a1. The winding M1b, when energized, is operable to respectively open and close sets of normaly closed and open contacts M1b1 and M1b2. The normally closed contacts LS–1a, LS–2b, LS–6a and M1b1 are connected in series circuit relation with the start winding M1a of the reversible Lowerator motor M–1 for driving the Lowerator chains 86 in a first direction to lower the carrier 70.

A limit switch LS–8 is also mounted at the upper portion of the Lowerator station 30 and includes normally open sets of contacts LS–8a nad LS–8b, which are closed when a cart C is moved into the upper portion of the Lowerator station 30. The contacts LS–8b are connected in parallel with the contacts LS–6a such that when the contacts LS–8b are closed, the circuit is completed through the starting winding M1a of the motor M–1 to drive the Lowerator motor M–1. Although the contacts LS–8b open as soon as the cart is moved downwardly from its raised position, the contacts LS–6a are then closed to maintain circuit continuity to the motor start winding M1a.

The advance and retract solenoids for the head frame operating cylinder 211 are shown at 211a and 211b respectively. When erergized, the solenoid 211b is operable to close normally open contacts 211b1. When a cart is moved downwardly to engage the limit switch LS–1b, the normally open contacts LS–1b are closed to complete the circuit through the normally closed contacts 211b1 and the solenoid 211a to move the nozzles 201 so as to be received by the nozzle receiving sockets 202 on the cart. A solenoid operable valve V, which is operable to selectively deliver air from an air supply AS to the left two sockets 202 when the solenoid V2 is energized and to the right two sockets 202 which are connected with, the right or outer ends, of the sheet clamping cylinders 47 via hoses 225 when the solenoid V1 is energized, is of the type in which the valve spool is normally in the neutral position until actuated by the solenoids V1 and V2. The solenoid V2, when actuated, is operable to open a set of normally closed contacts V2a. A limit switch LS–17 (FIG. 19) is actuated when the nozzles 201 are received in the sockets 202 on the cart to close a set of normally open contacts LS–17a connected in series with the normally closed contacts V2a and the solenoid V1. When a sheet of plastic has been placed on the cart position at the mid-portion of the Lowerator, a manually operable, spring returnable air unlocking switch AU, which is connected in series with the solenoid V2, is closed to direct air to the left two sockets. At this same time a manually operable switch s is actuated to close sets of normally open contacts s1 and s2. The contacts s1 are connected in series circuit relation with the solenoid 211b and the contacts s2 are connected in series with the solenoid V2. When switch s is closed to close the contacts s1, the solenoid 211b is energized to raise the head frame operating cylinder 211 and remove the cylinders 201 from the sockets 202. Simultaneously, the switch contacts s2 are closed to complete the circuit through the advance motor winding M1a to bypass the opened contacts LS–1a which will again close as soon as the Lowerator chains 86 move downwardly and release the limit switch LS–1.

The advance solenoids for actuating the spring returned kicker cylinders 197 are shown connected in parallel at 197a. The normally open contacts LS–2a are connected in series circuit relation with the parallelly connected advance solenoids 197a of cylinders 197. Thus, after the cart has moved downwardly from the mid-portion to the lower portion of the Lowerator to actuate the limit switch LS–2, the pistons of the kicker cylinders 197 are actuated to move the cart toward the left as viewed in FIG. 1 onto the advancing chains 83. As the kicker cylinders move the cart out of the Lowerator station, a limit switch LS–5, mounted adjacent thereto, is actuated to close the normally open contacts LS–5a connected in series with the normally closed contacts M1a1, the normally closed contacts LS–6b, which are opened when the Lowerator is in the uppermost position ready to receive a cart C, and the reversing winding M1b to drive the motor M–1 in the opposite direction. Although the contacts LS–5a are opened as soon as the cart moving to the advancing chains 83 passes the limit switch LS–5, the holding contacts M1b2 are then closed to maintain continuity to the motor winding M1b.

The chains 83, which are continuously driven by the motor M–2 connected across the lines L1 and L2, move the cart positioned thereon toward the elevator station 34 until the cart moves into the elevating station 34 to engage a limit switch LS–3 and close the normally open contacts LS–3a. A reversible elevator motor M–3 is provided for driving the chains 83 and includes starting windings M3a and M3b for starting the motor M–3 rotating in opposite directions so as to raise and lower respectively the carrier 75. The windings M3a and M3b are operable to close normally open holding contacts M3a1 and M3b1 respectively. Another limit switch LS–4 is mounted at the top of the elevator station and includes sets of normally closed contacts LS–4a and normally open contacts LS–4b which are opened and closed respectively when the limit switch LS–4 is actuated by a cart C being moved into locking engagement with another cart C at the uppermost portion of the elevator station. The normally closed contacts LS–4a are connected in series circuit relation with the normally open contacts LS–3a and the advance start winding M3a of the elevator motor M–3 for driving the elevator chains 86 to raise the cart positioned in the elevating station upwardly until the limit switch LS–4 is actuated to open the normally closed contacts LS–4a. The cart is halted in such a position that the tracks 76 and 77 of the elevator frame are in line with the tracks 79 and 80 extending through the heating station 33. The set of holding contacts M–3a1 are connected in parallel with the normally open contacts LS–3a. The contacts LS–4b are connected in series with the reverse winding M3b and the normally closed contacts LS–12a of a limit switch LS–12 positioned so as to be actuated when the carrier 75 is in the lowermost position. The holding contacts M3a1 and M3b1 respectively. Another limit switch LS–4b.

As will presently be explained, when the cart is raised to the elevated position, it is automatically coupled to the immediately adjacent cart in station 33 and when the drive motor 131 is driven to move the forwardmost car from the forming station 31 into the upper portion of the Lowerator station the elevated carts C will all be simultaneously moved in tandem from left to right as viewed in FIG. 2. When the cart in the forming station is moved into the upper portion of the Lowerator station, the limit switch LS–8 is actuated to close the normally open contacts LS–8a.

The advance solenoids for cylinders 142 and 143 for lowering the rails 81a supporting tracks 81 and 82 in the forming station are shown at 142a and 143a, respectively. The retract solenoids for raising the tracks 81 and 82 are shown at 142b and 143b. The normally open contacts LS–8a are connected in series circuit relation with the normally closed contacts LS–10c, which are opened when the tracks are lowered to actuate the limit switch LS–10 located in the path of the downwardly moving tracks, and the parallel circuit including the solenoids 142a and 143a. The limit switch LS–10 includes sets of normally open contacts LS–10a and LS–10b which are closed when the limit switch LS–10 is actuated. The solenoid 142a, when actuated, is operable to close a set of holding contacts 142a1.

The starting winding for driving the car advancing motor 131 in a direction so as to advance the carts toward the forming station is shown at 131a, while the starting winding for driving the motor 131 in the opposite direction to return the cart advancing blocks 133 is shown at 131b. Electrically operable heating coils, schematically shown at H, are connected across the lines L1 and L2 so as to be continuously energized.

A limit switch LS–7, located adjacent the forming station, is actuated when a car at the forming station is at a height so as to be connected in tandem with the next adjacent car. The limit switch LS–7 when energized closes and opens sets of normally open and closed contacts LS–7a and LS–7b respectively. The normally open contacts LS–7a are connected in series circuit with a set of normally closed contacts LS–13a of a limit switch LS–13 located adjacent the forward portion of the heat station 32 and the starting winding 131a. The limit switch LS–13 is so positioned as to be actuated when the block member 133 has reached its forwardmost position so as to move the cart C from the heating station 32 into the forming station in position to be lowered. The start winding 131a is operable, when energized, to close a set of normally open holding contacts 131a1 connected in parallel with the contacts L1–7a. A limit switch LS–9, located adjacent the rearwardmost portion of the heat station 33, is actuated by the block 133 in the rearwardmost position to open a normally closed set of contacts LS–9a connected in series circuit with the normally open contacts LS–10b and the start winding 131b.

A limit switch LS–16 which is actuated when the male mold is in the raised position is operable to close normally open contacts LS–16b and open normally closed contacts LS–16a and LS–16c. The contacts LS–16b are connected in series with the normally closed contacts LS–7b and the parallelly connected solenoids 142b and 143b. The male mold advance and retract solenoids of the cylinder 170 for lowering and raising the male mold, are shown at 170a and 170b respectively. The solenoid 170a is connected in series circuit relation with the normally open contacts LS–10a and the normally closed contacts LS–14b of a limit switch LS–14 which is actuated when the male mold reaches its lowermost position in engagement with the plastic sheet. The limit switch LS–14, when actuated, also closes sets of normally open contacts LS–14a and LS–14c. The contacts LS–14a are connected in series with the normally closed contacts LS–16c and a timer T that is operable to close and open sets of normally open and closed contacts T1 and T2 when the timer T times out. The solenoid 170a, when energized, is operable to open a set of normally closed contacts 170a1. A limit switch LS–15 (FIG. 11) is actuated when the piston rods 162 are in their uppermost position as shown in FIG. 11 to close the normally open contacts LS–15a and open the normally closed contacts LS–15b. The retract solenoid 170b is connected in series with the normally open limit switch contacts LS–15a and the normally closed contacts 170a1 and LS–16a.

A limit switch LS–11, mounted on the plate 193, is actuated when the cam assembly 190 is moved downwardly so as to cause the camway 189 to rock the rocker arm 185 and operate the connecting rods 182 to close the jaws 176 and 177 around the rods 162 below the nuts 163. The limit switch LS–11 includes a set of normally open contacts LS–11a which are closed when the limit switch LS–11 is actuated. The advance solenoids for lowering the piston rods 162 are shown at 159a and 160a respectively, whereas the retract solenoids are shown at 159b and 160b respectively. The solenoids 159b and 160b, when energized are operable to close and open normally open contacts 159b1 and normally closed contacts 160b1 respectively. The normally open contacts LS–11a are connected in series circuit with the normally closed contacts 160b1 and the parallelly connected solenoids 159a and 160a. The normally closed contacts LS–15b are connected in series circuit with the timer contacts T1 and the parallelly connected solenoids 159b and 160b. The holding contacts 159b1 are connected in parallel with the timer contacts T1. The solenoid for actuating the air and vacuum supply valve, for introducing the forming pressures on opposite sides of the plastic sheet, is shown schematically at AV connected in series with the timer contacts T2 and the normally open contacts LS–14c.

The operation

In operation it will be assumed that the cylinders 47 have been injected with air through the right two nozzles 201 in FIG. 19, and that the piston rods 47a have been retracted so that a plastic sheet P which has been formed can be manually removed at the loading-unloading station L-U. This occurs when the limit switch LS–1 is actuated by a descending cart at the Lowerator station to open contacts LS–1a and momentarily deenergize the winding M1a of the motor M–1 driving the Lowerator chains 86, about midway down the Lowerator. It occurs when the frame 210 mounting the hoses 224 leading to the left or inner ends of the cylinders 47, as shown in FIG. 4, reaches its lowermost position, the limit switch LS–17 being actuated to close the contacts LS–17a to energize the solenoid V1 to deliver air to the right two sockets 202. The solenoid V2 of the valve V which is energized by the operator pressing the spring returned switch AU, is operable to move the spool of the valve V to a position so as to deliver air through the left two nozzles 201 to the sockets 202 which are connected with the right or outer ends of the cylinders 47 via hoses 225. This switch is actuated by the operator after he has loaded a new unformed plastic sheet P to the car which has been temporarily halted, and causes the valve V to direct air to cylinders 47 so that rods 47a are extended to move the clamp frames 45 back to the clamped position in which they are shown in FIG. 4. The switch s is also manually actuated to energize the retract solenoids 211b for cylinders 211 which then raise the air-injecting frame head 206 to the inoperative positions shown in FIGS. 19 and 20. Actuation of the switch s also closes the contacts s2 to energize windings M1a and start the motor M–1 operating the Lowerator chains 86 which then lower the cart C to a lowermost position.

The limit switch LS–2 is actuated when the part C in the Lowerator reaches the lowermost position to open the contacts LS–2b and deenergize the Lowerator motor advance winding M1a. Simultaneously, the contacts LS–2a also close to energize the advance solenoids 197a of kicker cylinders 197, thereby causing the rods 199 to be sharply moved outwardly and move the car across such that its sprockets 65 are engaged by the continuously driven chains 83. At any one time, five cars are moving around the circuit and it is to be understood that the speeds of movement thereof are synchronized such that they move in properly timed relation through the cycle. The chains 83 move the car along the lower circuit of the machine and into the elevator carrier track 75 which is in lowermost position waiting to reecive it. The limit switch LS–3 which is actuated when the car moves fully onto the carrier track 75, closes the contacts LS–3a to energize the start winding M3a to drive the elevator motor M3 and the elevator chains 86 in a direction to raise the car slowly to uppermost position. As the car is raised into position, the rollers 101a are brought up into the trackway 101 of the immediately preceding car which is disposed within the heat station 33 and the limit switch LS–4, which has been actuated when the car reaches uppermost position in the elevator station, operates to deenergize the winding M3a and energize the reversing winding M3b to move the carrier track 75 to its original lowermost position where the limit switch LS–12 will be actuated to open the normally open contacts LS–12a and deenergize the winding M3b. In the meantime, as soon as the car left the Lowerator track carrier 70, the limit switch LS–5 was actuated which energized the reverse winding M1b of the Lowerator motor M–1 to drive the Lowerator chains 86 and return the Lowerator carrier track 70 to its upper position whence it actuated a limit switch LS–6 to open the contacts LS–6b to stop the Lowerator carrier track in upper position. Also, in the meantime, a forming cycle had been accomplished in a manner which will be described, and the car carrying the plastic sheet in the forming station had been moved back up to a position in which the forming station tracks align with the upper tracks along the upper run of the path of travel in the machine. In so doing, the limit switch LS–7 was actuated and the start winding 131a of the motor 131 is energized when the contacts LS–7a close to cause the chains 129 to be driven and the entire four cars, which are hooked together in tandem at the upper end of the machine, to be advanced one car length. As soon as the car, which previously has been in the forming station, has moved across to the Lowerator carrier track 70, the switch LS–8 is actuated, which not only causes the Lowerator motor M–1 to be operated to move the cart in the Lowerator downwardly and out of engagement with the other carts when the contacts LS–8b close, but also energizes the retract solenoids 142a and 143a of cylinders 142 and 143 respectively to lower the tracks 81 and 82 and thereby the cart in the forming station 31 downwardly to the position shown in chain lines in FIG. 11, when the contacts LS–8a close. In so doing, this cart is, of course, disengaged from the cart in the heating station 32. When the motor 131 has driven the carts connected in tandem one cart length, the limit switch LS–13 (FIG. 2) is actuated to open the contacts LS–13a and deenergize the advance winding 131a of motor 131. When the tracks 81 and 82 reach lower position, a limit switch LS–10 is actuated which opens the contacts LS–10c to deenergize the solenoids 142a and 143a, and closes the contacts LS–10a which energizes the advance solenoid 170a of the cylinder 170 and causes the upper platen 164 to likewise be lowered to the position shown in chain lines in FIG. 11. When the limit switch LS–10 is actuated, the contacts LS–10b close to energize the reverse winding 131b of the cart advancing motor 131 to return the cart advancing blocks 133 to their starting position where the limit switch LS–9 is actuated to open the contacts LS–9a and denergize the winding 131b.

As the male member 171 is lowered into the chain line position shown in FIG. 11, it operates as a plug assist member initially, and then, when the limit switch LS–14 is actuated, as the male mold balloons the plastic sheet, vacuum is applied via solenoid operated valve AV and then air under pressure is supplied (after a short time delay caused by time delay relay TD) through the solenoid operated valve AA to the male mold 171, so that a differential pressure forming operation is accomplished. Just prior to the time air and suction forces are used to accomplish the forming, the descent of the upper platen 164 has caused the camway 189 to rock the rocker arms 185 and operate connecting rods 182 to close the jaws 176 and 177 around the rods 162 below nuts 163. The limit switch LS–11, which is actuated when this movement is completed to close the contacts LS–11a, energizes the advance solenoids 159a and 160a of the cylinders 159 and 160 to cause a mold pressurizing or clamping pressure to be applied to the upper platen 164 and securely clamp the molds 171 and 153 together.

After a short time during which the forming is accomplished, the timer T, which was started when the limit switch LS–14 was actuated to close the contacts LS–14c, times out to open the contacts T2 to deenergize the valves AU and AV to remove the forming pressure, and close the contacts T1 which energizes the retract solenoids 159b and 160b of the cylinders 159 and 160 to return the piston rods 162 shortly thereafter to their upper position. When the rods 162 reach their upper position, they actuate the limit switch LS–15 and open the contacts LS–15b to deenergize the solenoids 159b and 160b and close the contacts LS–15a to energize the retract solenoid 170b of cylinder 170 to return the upper platen 164 to its upper position, where the limit switch LS–16 is actuated to open the contacts LS–16a and deenergize the retract solenoid 170b. The contacts 16b simultaneously close, the advance solenoids of cylinders 143 are energized, and the track sections 81 and 82 move the cart C upwardly again to reengage the cart C with the immediately following cart which is disposed in the heat station 32. With the opening of the contacts LS–16c, as the limit switch LS–16 is actuated, the timer T is reset to its starting position. Of course, the rate of heating is such in stations 33 and 32 that by the time a plastic sheet P has reached the forming station 31 and is in position to be formed, it is heated to a proper forming temperature and is deformable to assume the shape of the molds 171 and 153.

While in the typical circuit described, the plastic sheet P is brought down to the mold 153 before the upper mold 171 commences to descend and the upper mold 171 is moved all the way to uppermost position before the formed plastic sheet P is raised, in practice the mold 171 could travel downwardly with the sheet P (so long as the sheet P first reaches mold 153) and the formed sheet could be started upwardly before the mold 171 reached uppermost position. Moreover, mechanism could be employed to releasably secure the carts to their tracks during any time they were not to be moved. Such mechanism would be released just prior to the time a particular cart was to be advanced in the circuit.

With a construction of the type described wherein the lower female mold is stationarily mounted and the upper male mold and plastic sheet move down to it, considerable vertical space is conserved and there is no necessity of providing floor wells or the like to house a vertically movable lower mold.

Also, because the track sections provided include the flat surfaced wheels 60 and flat surfaced track sections, lateral thermal expansion is no problem.

It is to be understood that various changes may be made in the various parts and assemblies described, and that parts may be omitted without departing from the spirit of the invention and the scope of the appended claims.

We claim:

1. Apparatus for forming shapes in sheets of deformable thermoplastic material comprising:
    molding means including a mold cavity for forming shapes in said sheets of plastic at a molding station;
    a plurality of individual, sheet transporting means for supporting sheets of thermoplastic material; and
    means for moving said sheet transporting means in a longitudinally extending path of travel through said molding station;
    each of said transporting means including means for removably coupling each of said transporting means with an adjacent transporting means in a manner such that the adjacent transporting means are decoupled when they are relatively moved in a path extending angularly to said longitudinally extending path of travel.

2. Apparatus as set forth in claim 1 including means for individually moving one of said transporting means relative to an adjacent transporting means to decouple said one transporting means from the adjacent transporting means.

3. Apparatus as set forth in claim 1 wherein said coupling means comprises cooperating recess means and means receivable in said recess means.

4. Apparatus as set forth in claim 3 wherein said recess means has an hour-glass shape and said means receivable in said recess means comprises roller means.

5. Apparatus as set forth in claim 1 wherein said coupling means comprises slot means formed on one end of each of said transporting means and slot entering means formed on the other end of each of said transporting means for entering the slot means of an adjacent transporting means.

6. Apparatus as set forth in claim 5 wherein said slot means includes a pair of slots adjacent opposites sides of said transporting means which are open at both ends to permit the slot entering means to enter and depart from opposite ends of the slots when the adjacent carriages are relatively moved in said angularly extending path.

7. Apparatus for forming shapes in sheets of deformable thermoplastic material comprising:
    frame means;
    a molding station comprising a mold part supported by said frame means and including a mold cavity for molding shapes in said sheets;
    sheet supporting means for supporting sheets of thermoplastic material;
    means for advancing said sheet supporting means in a path of travel through said molding station to mold shapes in said sheets;
    said sheet supporting means including fluid pressure operated sheet gripping means movable between a non-engaging position and a sheet engaging position;
    disengageable fluid supply means adjacent the path of travel of said sheet supporting means selectively movable from a remote inoperative position to an operative position in fluid communication with the fluid operable sheet gripping means on said sheet supporting means for selectively operating said sheet gripping means; and means for moving said fluid supply means between said inoperative and operative positions.

8. Apparatus as set forth in claim 7 wherein said fluid supply means and said fluid operated sheet gripping means include a plurality of cooperating nozzle means and socket means removably couplable when said fluid supply means is in said operative position for supplying fluid from said fluid supply means to said sheet gripping means; and valve means is provided for selectively directing fluid through selected ones of said cooperating nozzle and socket means.

9. Apparatus for forming shapes in sheets of deformable thermoplastic material comprising:
frame means;
opposing differential pressure mold parts thereon forming a mold station for forming shapes in the sheets of thermoplastic material, one of said parts having a sheet forming cavity;
a plurality of removably couplable sheet supporting means for supporting sheets of said thermoplastic material;
means for simultaneously advancing a plurality of coupled individual sheet supporting means in a longitudinally extending path of travel for sequentially advancing sheets of deformable thermoplastic material to a position between said mold parts at said mold station and removing them therefrom after shapes have been formed therein;
means for decoupling the sheet supporting means positioned at said mold station from the adjacent sheet supporting means;
means for relatively moving the mold parts to engage opposite sides of said sheet and permit a shape to be formed in the sheet of thermoplastic material carried by the decoupled sheet supporting means, and then away; and
means for recoupling the decoupled sheet supporting means with the adjacent sheet gripping means.

10. The apparatus of claim 9 wherein the decoupling means comprises means for moving the sheet supporting means positioned at said mold station toward one of said mold parts in a second path of travel extending angularly to said longitudinally extending path of travel.

11. The apparatus of claim 9 wherein each of said carriage means includes means for removably coupling each of said carriage means with an adjacent carriage means in a manner such that the adjacent carriage means are decoupled when they are relatively moved in a path extending angularly to said longitudinally extending path of travel.

12. The apparatus of claim 11 wherein the means for removably coupling includes a pair of slots, open at both ends, formed on one end of each of said carriage means, and a pair of slot entering means mounted on the other end of each of said carriage means for entering the slots of an adjacent carriage means.

13. The apparatus of claim 9 including means for clamping the opposed mold parts together when said mold parts are in the sheet engaging position.

14. The apparatus of claim 13 wherein said clamping means includes movable ram means connected with one of said mold means; means for removably connecting the other of said mold parts and said ram means; and means actuable to move said ram means to exert a loading force on said connecting means and said other mold part in a direction toward said one mold part for clamping the opposed mold parts to said sheet.

15. Apparatus for forming shapes in sheets of thermoplastic material comprising:
frame means;
a pair of oppositely disposed mold means mounted thereon in vertically spaced relation for relative closing and separating movement, at least one of said mold means being formed with a mold cavity;
means for moving a sheet of plastic between said pair of mold means;
means for relatively closing said mold means to hold said sheet therebetween;
means for providing a differential pressure on opposite sides of a sheet held between said mold means to deform said sheet into said mold cavity;
movable ram means operatively connected with one of said mold means;
means responsive to the relative closing of the mold means for removably connecting the other of said mold means and said ram means; and
means actuable to move said ram means and said connecting means to exert a loading force on said connecting means and the other of said mold means in a direction toward said one mold means for clamping the opposed mold means to said sheet.

16. Apparatus as set forth in claim 15 wherein said connecting means includes a set of ram gripping members movable from an open, inoperative position to a closed, ram gripping position for gripping the ram when it is moved to exert said loading force.

17. Apparatus as set forth in claim 16 wherein said connecting means includes cooperating cam and cam follower means responsive to the relative movement of said mold means for actuating said gripping members to the ram gripping position.

18. Apparatus for forming shapes in plastic sheets comprising:
a heating station, including heater elements;
a forming station, including a mold having a forming cavity, in line with said forming station and downstream thereof;
a plurality of individual sheet supporting carriage means for supporting sheets of thermoplastic material, removably coupled in tandem;
means for supporting said carriage means for travel through said stations;
drive means movable in a to and fro path for releasably engaging and moving the plurality of sheet supporting means incrementally forwardly through said stations; said drive means having means for releasably engaging one of said carriage means in a manner to move said plurality of carriage means forwardly when the drive means is moved forwardly and to permit said drive means to escape said carriage means and return rearwardly; and
means for driving said drive means in said to and fro path.

19. Apparatus as set forth in claim 18 wherein said drive means comprises a reciprocable block member having a recess formed therein for sequentially receiving a portion of each carriage means; a retractable drive lug pivotally mounted on said block member adjacent said recess; and means yieldingly urging said drive lug away from said recess and into engagement with said portion of said carriage means.

20. The apparatus of claim 18 wherein said sheet supporting means are releasably coupled in a manner such that relative movement thereof in a path angular to said path of travel decouples them, and including means for moving the sheet supporting means positioned at said mold station in a second path of travel extending angularly to the to and fro path of travel to decouple the sheet supporting means positioned at said mold station from the adjacent sheet supporting means in said heat station.

21. The apparatus of claim 18 wherein said drive means is movable in the heating station adjacent said forming station and juxtaposed heating elements are provided for heating the sheets of plastic;
said drive means being operably connectible with only said one sheet carriage means in said heating station to move said one sheet carriage means positioned at said heating station toward said mold station while simultaneously drawing a trailing sheet carriage means toward said heating station.

22. Apparatus for forming shapes in sheets of deformable thermoplastic material comprising:
a plurality of individual sheet supporting means for supporting sheets of thermoplastic material;
heating means forming a sheet heating station;
mold means including a mold with a cavity forming a shape molding station for molding shapes in said thermoplastic sheets;
elevating means for individually raising said sheet supporting means to an elevated position;
means for moving elevated sheet supporting means through said heating station and said molding station to form shapes in said sheets of thermoplastic material;
lowering means for individually lowering the sheet supporting means supporting sheets of thermoplastic material having shapes formed therein to a lowered position;
means for halting said sheet supporting means at a sheet unloading station where sheets having formed shapes are removed from the sheet supporting means and a sheet loading station where new sheets are placed on said sheet supporting means; and
means for individually moving said sheet supporting means from said lowering means, beneath said heating means and said molding means, to said elevating means.

23. The combination defined in claim 22 in which said mold means comprises an upper mold and a lower mold, and said upper mold is mounted for vertical travel relative to said lower mold which is stationarily supported for the molding operation; and means is provided at said mold means for supporting said sheet supporting means for vertical travel to and from the lower mold.

24. The combination defined in claim 23 in which said lower mold has the cavity.

25. The combination defined in claim 23 in which coupling means for releasably coupling the sheet supporting means for movement in tandem are provided on said sheet supporting means; said coupling means being so formed that movement of a sheet supporting means to uppermost position by said elevating means effects coupling of it to the immediately preceding sheet carrying means, and lowering of a sheet supporting means by said lowering means effects decoupling of it from the immediately following sheet supporting means.

26. Apparatus for forming shapes in sheets of deformable thermoplastic material comprising:
a plurality of individual sheet supporting means for supporting sheets of thermoplastic material;
heating means forming a sheet heating station for heating said sheets of thermoplastic material;
mold means including a mold with a cavity providing a molding station for molding shapes in the heated sheets of thermoplastic material;
first means for vertically individually moving said sheet supporting means in a first direction;
means for receiving the sheet supporting means from said first means and moving a plurality of the vertically moved sheet supporting means in a generally horizontally extending path through said sheet heating station and said molding station in tandem; and
second means for vertically individually moving the horizontally moved sheet supporting means in an opposite direction.

27. The apparatus as set forth in claim 26 wherein said first vertically moving means comprises elevating means and said second vertically moving means comprises lowering means.

28. The apparatus as set forth in claim 27 including means for individually moving said sheet supporting means generally horizontally from said lowering means to said elevating means.

29. The apparatus as set forth in claim 28 wherein said last mentioned horizontally moving means comprises conveying means having its terminal end adjacent said elevating means and transfer means is included for horizontally individually transferring said supporting means from said lowering means to said conveying means.

30. Apparatus as set forth in claim 26 wherein each of said sheet supporting means includes pressure fluid operated sheet gripping means movable between a removed position and a sheet gripping position; and fluid supply means mounted independently of said sheet supporting means selectively movable from a removed position to an operating position in fluid communication with the sheet gripping means on said supporting means for selectively operating said sheet gripping means.

31. Apparatus as set forth in claim 26 wherein tracks are provided at said heating station and forming station on which said sheet supporting means ride; one of said tracks being formed to prevent lateral displacement of said sheet supporting means and the other being formed to allow for lateral thermal expansion due to the passage of said sheet supporting means through the heating station.

32. Apparatus for differential pressure forming sheets of deformable thermoplastic material comprising:
frame means;
molding means thereon including a mold having a mold cavity for forming shapes in said sheets of plastic at a molding station, and an opposite mold member;
actuating means for relatively moving said molds to and from separated and closed positions;
a plurality of sheet transporting carriers for supporting sheets of thermoplastic material in a planar path of travel; and
means for moving said sheet transporting carriers to said molding station when the mold and mold members are separated to dispose plastic sheets between said mold members;
said transporting carriers including means for removably coupling one carrier with an adjacent transporting carrier in a manner such that the adjacent carriers are automatically decoupled when they are relatively moved in a path extending substantially at right angles to said path of travel.

33. The combination defined in claim 32 in which means at said molding station is operative to move a carrier, at said molding station and between said molds, vertically to decouple it from an adjacent carrier prior to the time said means is operated to relatively move said molds to closed position.

34. The combination defined in claim 33 in which one of said molds is stationary, and said means at said molding station for moving a carrier to decouple it moves said carrier to a position vertically adjacent the stationary mold.

35. The combination defined in claim 32 in which conveyor means is provided for moving said carriers in a circuit which includes an elevator for raising carriers up to said path of travel and automatically coupling a carrier raised to said path of travel with an adjacent carrier in said path of travel.

36. The system defined in claim 35 in which heating means forming a sheet heating station is provided laterally adjacent said mold station and vertically adjacent said path of travel; and said elevator delivers a carrier to be coupled to couple with a carrier at said sheet heating station.

37. The system defined in claim 35 in which removably engageable drive means is provided at said heating station for engaging one of said carriers and moving carriers coupled in tandem in indexing movements followed by periods of dwell along said path of travel.

38. The system defined in claim 37 in which detachable coupling means on said latter drive means and a carrier are provided which automatically decouple upon vertical movement of a carrier; and vertically movable means is provided at said mold station for moving a carrier between said molds vertically.

39. The system defined in claim 38 in which said drive means travels to and fro; and means is provided for returning said drive means only after said vertical movement of the carrier to disengage it from the drive means at said mold station.

40. The system defined in claim 32 in which conveyor means is provided for moving said carriers in a circuit which includes a Lowerator for lowering carriers from said path of travel to automatically decouple a carrier being lowered from an adjacent carrier.

41. The combination defined in claim 8 in which said sheet gripping means includes fluid pressure operated ram cylinders carried by said sheet supporting means; and passage means for transferring fluid under pressure thereto.

42. Apparatus for differential pressure forming sheets of thermoplastic material comprising:
frame means;
a pair of oppositely disposed mold members mounted in spaced relation thereon for relative axial closing and separating movement, at least one of said mold members being formed with a mold cavity;
means for relatively axially moving said mold members;
means for moving a sheet of plastic between said pair of mold members when the latter are relatively separated;
means for providing a differential pressure on opposite sides of a sheet held between said mold members to deform said sheet into said mold cavity;
axially movable actuator means operatively connected with one of said mold members;
normally disengaged coupling means, acting responsive to the relative closing of the mold members, for removably coupling the other mold member with said actuator means to permit axial pressure to be applied through said coupling means; and
means for operating said actuator means to exert an axial loading force on the coupling means and other of said mold members in a direction toward said one mold member for clamping the opposed mold members to said sheet.

43. The combination defined in claim 42 in which said normally disengaged means comprises relatively laterally closable gripper means on the other mold member; and said actuator means includes an enlarged part outboard of said gripper means when the latter are closed for exerting a pressure thereon.

44. The combination defined in claim 43 in which cam and cam follower means operated by relative closing movement of said mold members operates to close said gripper means.

45. The combination defined in claim 44 in which said gripper means comprise laterally swingable arms and said actuator means includes a ram having a piston rod with an enlarged normally disengaged outer end inboard of which said arms grip the rod.

46. The combination defined in claim 44 in which a vertically extending cam track having a vertically offset portion is provided on frame means, and said cam follower travels with one of said mold members.

47. Apparatus for differential pressure forming sheets of deformable thermoplastic material comprising:
a plurality of individual, sheet supporting means for supporting sheets of thermoplastic material;
frame means including means forming vertically spaced upper and lower runs along which said sheet supporting means travel;
heating means forming a sheet heating station;
a pair of immediately downstream oppositely disposed mold means mounted in vertically spaced relation above and below the said run respectively for relative vertical closing and separating movement;
at least one of said mold means including a mold with a cavity forming a shape molding station for molding shapes in said thermoplastic sheets;
elevator means for individually raising said sheet supporting means to an elevated position adjacent said upper run;
Lowerator means for individually lowering said sheet supporting means to a lowered position adjacent said lower run;
means for moving said sheet supporting means from said heating station through said molding station to form shapes in said sheets of thermoplastic material;
means for halting said sheet supporting means at a station where sheets having formed shapes are removed from the sheet supporting means and sheets to be formed are placed on said sheet supporting means; and
transfer means for individually moving said sheet supporting means in a path vertically juxtaposed with said molding means between said elevator and Lowerator means.

48. The combination defined in claim 47 in which said transfer means includes longitudinally extending conveyor mechanism; means on said sheet supporting means for releasably engaging said conveyor mechanism; and fluid pressure operated cylinders operable to releasably engage said sheet supporting means and move them sequentially over to said conveyor mechanism.

49. The combination defined in claim 48 in which said elevator and Lowerator have vertically movable carriers for supporting said sheet supporting means for individual travel; and said cylinders are disposed on one of said carriers and have projecting striker pistons for moving into engagement with said sheet supporting means and moving them at least partly off said carrier.

50. The combination defined in claim 48 in which said conveyor mechanism comprises endless chains for delivering said sheet supporting means sequentially from said Lowerator to the elevator and said means on said sheet supporting means for releasably engaging said conveyor mechanism comprises sprockets.

51. The combination defined in claim 7 in which an elevator and Lowerator having vertically movable sheet supporting means carriers communicate with said path of travel to pass said sheet supporting means in a circuit; and said disengageable fluid supply means is mounted on one of said carriers.

52. The combination defined in claim 41 in which said sheet gripping means includes locking linkage actuated by said cylinders for maintaining said gripping means gripped even after disengagement of said fluid supply means.

53. The combination defined in claim 52 in which said cylinders are double acting and said locking linkage is released when said cylinders are oppositely actuated.

References Cited
UNITED STATES PATENTS

| | | | |
|---|---|---|---|
| 3,025,566 | 3/1962 | Kostur | 18—DIG. 48 |
| 356,879 | 2/1887 | Lister | 18—4 C |
| 2,342,920 | 2/1944 | Clark | 18—4 C |
| 2,713,935 | 7/1955 | Bishop | 18—4 CX |
| 3,176,349 | 4/1965 | Meisner et al. | 18—19 F |
| 3,384,939 | 5/1968 | Baker | 198—19 X |
| 3,553,781 | 1/1971 | Miller et al. | 18—19 D |

ROBERT L. SPICER, JR., Primary Examiner

U.S. Cl. X.R.

425—351, 397, 455, 404